US006955267B2

(12) United States Patent
Taylor et al.

(10) Patent No.: US 6,955,267 B2
(45) Date of Patent: Oct. 18, 2005

(54) STORAGE AND DISPLAY RACK FOR DVDS

(75) Inventors: Charles E. Taylor, Punta Gorda, FL (US); Andrew J. Parker, Novato, CA (US); Edward C. McKinney, Jr., Novato, CA (US)

(73) Assignee: Sharper Image Corporation, San Francisco, CA (US)

(*) Notice: Subject to any disclaimer, the term of this patent is extended or adjusted under 35 U.S.C. 154(b) by 0 days.

(21) Appl. No.: 10/354,558

(22) Filed: Jan. 30, 2003

(65) Prior Publication Data

US 2003/0226814 A1 Dec. 11, 2003

Related U.S. Application Data

(60) Provisional application No. 60/386,109, filed on Jun. 5, 2002, and provisional application No. 60/386,004, filed on Jun. 5, 2002.

(51) Int. Cl.[7] .................................................. A47F 7/00
(52) U.S. Cl. ..................................... 211/40; 206/308.2
(58) Field of Search .......................... 211/40; 206/308.2, 206/308.1, 309; 292/80; 70/57.1, 276

(56) References Cited

U.S. PATENT DOCUMENTS

| | | | |
|---|---|---|---|
| 553,109 A | 1/1896 | Davison | 211/121 |
| 579,076 A | 3/1897 | Placier | 211/121 |
| 718,752 A | 1/1903 | Findley | 211/121 |
| 887,282 A | 5/1908 | Smith | 211/121 |
| 887,828 A | 5/1908 | Mill | |
| 1,008,823 A | 11/1911 | Hill | 312/134 |
| 1,013,015 A | 12/1911 | Herman | 211/121 |
| 1,995,273 A | 3/1935 | Dohrwardt | 198/154 |
| 2,819,801 A | 1/1958 | Winkler | 211/121 |
| 2,869,708 A | 1/1959 | Nesseth | 198/158 |
| 2,912,118 A | 11/1959 | Behrens | 211/121 |
| 2,969,867 A | 1/1961 | McClelland | 198/33 |

(Continued)

FOREIGN PATENT DOCUMENTS

| | | |
|---|---|---|
| DE | 9206594 U1 | 9/1992 |
| DE | 9313107 U1 | 12/1993 |
| DE | 9408242 U1 | 9/1994 |
| DE | 9412562 U1 | 11/1994 |
| DE | 19509911 A1 | 9/1995 |
| DE | 19602585 A1 | 7/1997 |

OTHER PUBLICATIONS

U.S. Appl. No. 09/625,228, filed Jul. 24, 2000, Caplan.
U.S. Appl. No. 10/354,380, filed Jan. 30, 2003, Taylor.
U.S. Appl. No. 10/354,558, filed Jan. 30, 2003, Taylor.

*Primary Examiner*—Bruce A. Lev
(74) *Attorney, Agent, or Firm*—Bell, Boyd & Lloyd LLC

(57) ABSTRACT

A high capacity motorized rack holds a plurality of DVD boxes or containers in holders flexibly inter-connectable with each other to form a rotatable continuous loop. The loop is rotatably retained within a vertical rack housing and is driven by a motor, disposed within the housing, under user control such that the loop is rotated until a desired DVD is moved to the top fan-out region of the belt. A rack may hold two or more such loops of inter-connected holders. A preferred embodiment employs inter-connectable holders that each retain two DVD boxes in a side-by-side configuration. A lamp and/or barcode scanner may be disposed on the housing for ease of DVD selection. User control can include voice commands to direct loop rotation and speed.

8 Claims, 22 Drawing Sheets

U.S. PATENT DOCUMENTS

| | | | |
|---|---|---|---|
| 3,141,123 A | 7/1964 | Olson | 318/467 |
| RE25,919 E | 11/1965 | Anders | 312/223 |
| 3,428,384 A | 2/1969 | Goldammer | 312/223 |
| 3,537,599 A * | 11/1970 | Richard | 206/443 |
| 3,720,451 A | 3/1973 | Anders | 312/268 |
| 3,722,743 A | 3/1973 | Atchley | 221/77 |
| 3,738,178 A | 6/1973 | Marquis | 74/3.5 |
| 3,786,927 A | 1/1974 | Manheim | 211/4 |
| 3,937,316 A | 2/1976 | Gerhardt | 198/156 |
| 4,026,617 A | 5/1977 | Bosio | 312/268 |
| 4,084,691 A | 4/1978 | Leedom | 206/313 |
| 4,097,704 A | 6/1978 | Piber | 200/157 |
| 4,275,762 A | 6/1981 | Field | 137/601 |
| 4,428,005 A | 1/1984 | Kubo | 360/10.3 |
| 4,630,949 A | 12/1986 | Boella | 400/568 |
| 4,844,260 A | 7/1989 | Jaw | 206/444 |
| 4,884,691 A | 12/1989 | Behrens | 206/444 |
| 4,940,142 A | 7/1990 | Behrens | 206/444 |
| 5,103,986 A | 4/1992 | Marlowe | 211/41 |
| 5,147,034 A * | 9/1992 | Broadhead et al. | 206/1.5 |
| 5,154,301 A | 10/1992 | Kos | 211/41 |
| 5,160,050 A | 11/1992 | Russo | 211/40 |
| 5,176,250 A | 1/1993 | Cheng | 206/45.13 |
| 5,180,058 A | 1/1993 | Hu | 206/309 |
| 5,187,630 A | 2/1993 | MacKay | 360/137 |
| 5,188,228 A | 2/1993 | Barrett | 206/310 |
| 5,201,414 A | 4/1993 | Kaszubinski | 206/309 |
| 5,209,086 A * | 5/1993 | Bruhwiler | 70/57.1 |
| 5,242,060 A | 9/1993 | Chiang | 211/41 |
| 5,255,773 A | 10/1993 | Pollock | 198/347.3 |
| 5,283,603 A | 2/1994 | Kronbauer | 353/114 |
| 5,290,118 A | 3/1994 | Ozeki | 402/79 |
| 5,293,992 A | 3/1994 | Warner | 206/309 |
| 5,314,242 A | 5/1994 | Ludlow | 312/9.45 |
| 5,322,162 A | 6/1994 | Melk | 206/310 |
| 5,349,331 A | 9/1994 | Sieber | 340/572 |
| 5,351,161 A | 9/1994 | MacKay | 360/137 |
| 5,366,073 A * | 11/1994 | Turrentine et al. | 206/309 |
| D353,322 S | 12/1994 | Oshry | D9/306 |
| 5,383,554 A * | 1/1995 | Cowan | 206/310 |
| 5,396,987 A | 3/1995 | Temple | 206/309 |
| 5,464,091 A | 11/1995 | Callahan | 206/45.15 |
| 5,474,170 A | 12/1995 | Erickson | 206/44 R |
| 5,518,112 A | 5/1996 | Ono | 206/308.3 |
| 5,520,279 A | 5/1996 | Lin | 206/308.1 |
| 5,573,120 A | 11/1996 | Kaufman | 206/755 |
| 5,590,767 A | 1/1997 | Li | 206/308.1 |
| 5,593,031 A | 1/1997 | Uchida | 206/308.1 |
| 5,593,032 A | 1/1997 | Staley | 206/309 |
| 5,651,202 A | 7/1997 | Hewitt | 40/605 |
| 5,672,512 A | 9/1997 | Shaw | 436/46 |
| 5,685,439 A * | 11/1997 | Luenser | 211/183 |
| 5,695,053 A | 12/1997 | Koh | 206/308.1 |
| 5,695,054 A | 12/1997 | Weisburn | 206/308.1 |
| 5,697,498 A | 12/1997 | Weisburn | 206/308.1 |
| 5,699,905 A | 12/1997 | Hara | 206/308.1 |
| 5,703,774 A | 12/1997 | Houck | 364/424.06 |
| 5,704,474 A | 1/1998 | Oland | 206/308.1 |
| 5,711,431 A | 1/1998 | Reichert | 211/45 |
| 5,715,937 A | 2/1998 | Oshry | 206/308.1 |
| 5,715,948 A | 2/1998 | Hung | 211/40 |
| 5,725,105 A * | 3/1998 | Boland | 211/40 |
| 5,727,681 A | 3/1998 | Li | 206/308.1 |
| 5,730,283 A | 3/1998 | Lax | 206/308.1 |
| 5,746,325 A * | 5/1998 | Lee | 211/40 |
| 5,762,187 A * | 6/1998 | Belden et al. | 206/308.2 |
| 5,765,695 A | 6/1998 | Picciallo | 211/40 |
| 5,775,491 A | 7/1998 | Taniyama | 206/308.1 |
| 5,813,525 A | 9/1998 | McQueeny | 206/308.1 |
| 5,823,332 A | 10/1998 | Clausen | 206/307.1 |
| 5,833,062 A | 11/1998 | Yeh | 206/307.1 |
| 5,839,576 A | 11/1998 | Kim | 206/308.1 |
| 5,845,790 A | 12/1998 | Smith | 211/41.12 |
| 5,848,688 A | 12/1998 | Paloheimo | 206/308.1 |
| 5,881,872 A | 3/1999 | Frick | 206/308.1 |
| 5,882,052 A * | 3/1999 | Whitehead | 292/80 |
| 5,906,275 A | 5/1999 | Jokic | 206/308.1 |
| 5,915,549 A * | 6/1999 | Palmer et al. | 206/308.1 |
| 5,964,356 A | 10/1999 | Gareau | 211/40 |
| 6,182,825 B1 | 2/2001 | Butcher | 206/308.1 |
| 6,202,861 B1 | 3/2001 | Mah | 211/40 |
| 6,215,264 B1 | 4/2001 | Ma | 318/293 |
| 6,424,526 B1 * | 7/2002 | Heard | 361/687 |
| 6,430,976 B1 * | 8/2002 | Mitsuyama | 70/57.1 |
| 6,464,088 B1 | 10/2002 | Caplan | 211/40 |
| 6,520,347 B2 | 2/2003 | Caplan | 211/40 |
| 6,523,700 B2 * | 2/2003 | Nadeau | 211/40 |
| 6,561,346 B1 * | 5/2003 | Lew et al. | 206/308.1 |
| 6,598,752 B1 * | 7/2003 | Davidov | 211/40 |
| 2001/0045400 A1 * | 11/2001 | Caplan et al. | 211/40 |
| 2002/0190012 A1 | 12/2002 | Taylor | |
| 2002/0190013 A1 | 12/2002 | Caplan | |
| 2002/0190014 A1 | 12/2002 | Taylor | |
| 2003/0042216 A1 | 3/2003 | Taylor | |
| 2003/0047525 A1 | 3/2003 | Taylor | |
| 2003/0047526 A1 * | 3/2003 | Taylor et al. | 211/40 |
| 2003/0080006 A1 * | 5/2003 | Ku | 206/308.1 |

* cited by examiner

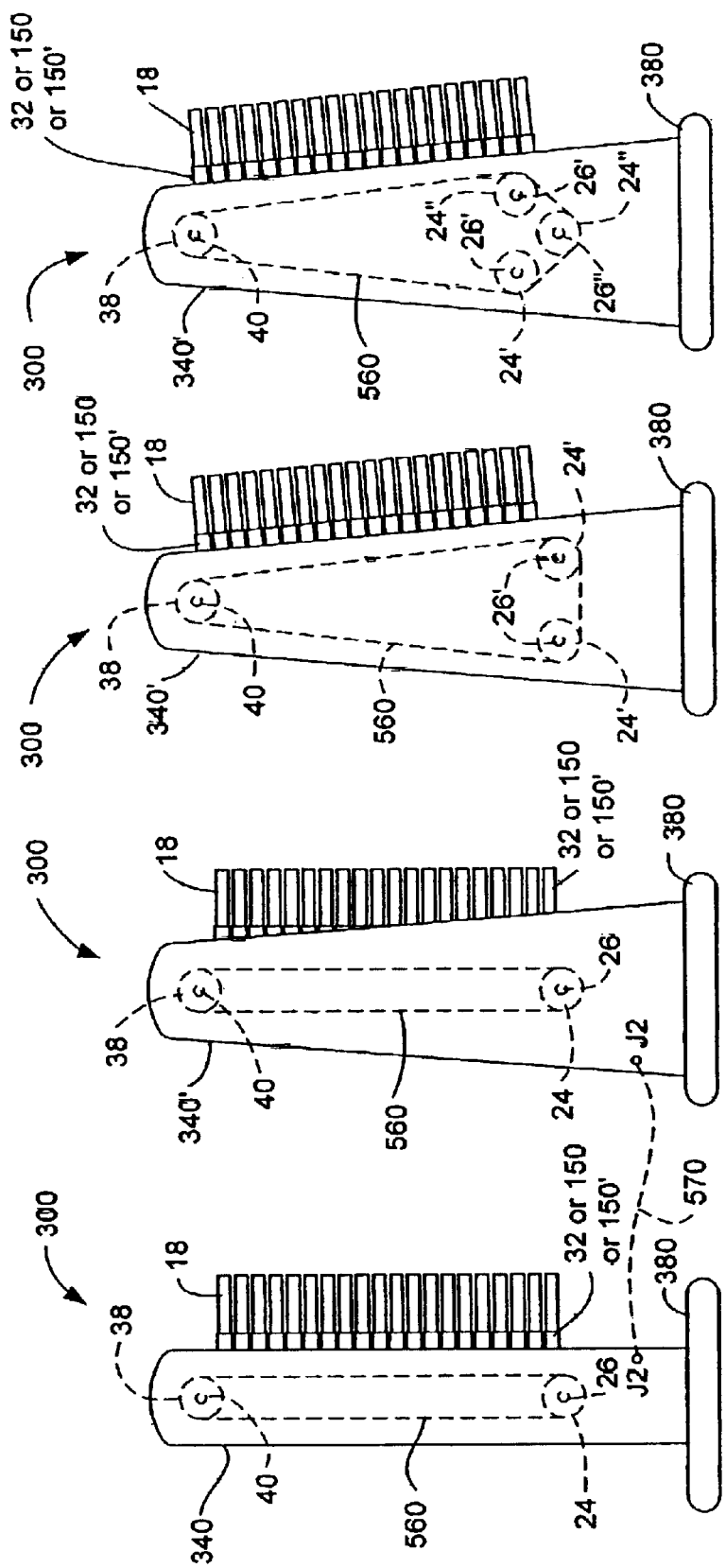

STORAGE AND DISPLAY RACK FOR DVDS

CLAIM OF PRIORITY

This application claims priority from U.S. Provisional Patent Application No. 60/386,109, filed on Jun. 5, 2002, and No. 60/386,004, filed on Jun. 5, 2002, and which applications are incorporated herein by reference.

CROSS-REFERENCE TO RELATED APPLICATIONS

This application is related to co-pending application: "STORAGE AND DISPLAY RACK FOR DVDs," U.S. application Ser. No. 10/354,380, filed Jan. 30, 2003, which is related to U.S. patent application Ser. No. 10/215,793, filed on Aug. 9, 2002, which is related to U.S. patent application Ser. No. 10/215,767, filed on Aug. 9, 2002, which is related to U.S. patent application Ser. No. 10/215,745, filed on Aug. 9, 2002, which is related to U.S. patent application Ser. No. 10/215,744, filed on Aug. 9, 2002, which is related to U.S. patent application Ser. No. 10/215,743, filed on Aug. 9, 2002, which is related to U.S. patent application Ser. No. 10/215,696, filed on Aug. 9, 2002, which is related to U.S. patent application Ser. No. 09/873,807, filed on Jun. 4, 2002, now U.S. Pat. No. 6,520,347, which is related to U.S. patent application Ser. No. 09/721,001, filed on Nov. 22, 2000, now U.S. Pat. No. 6,464,088, which is related to U.S. patent application Ser. No. 09/625,228, filed on Jul. 24, 2000, and which is related to U.S. patent application Ser. No. 09/240,308, filed on Jan. 29, 1999, now abandoned, and which applications are incorporated herein by reference.

FIELD OF THE INVENTION

The present invention relates generally to racks for holding objects such as digital video disks (DVDs), DVD cases, and other similar items.

BACKGROUND OF THE INVENTION

DVD racks that have no moving parts, in the form of vertical towers or horizontal cabinets, are known. When a large quantity of DVDs are stored in such towers or cabinets, it can be difficult to display and select a desired DVD, especially if the desired DVD is stored in the lower portion of a vertical tower.

Applicants' parent application disclosed a motorized compact disk (CD) storage device or rack that can store many CDs or the like in a rotatable rack and that can rotate the CDs until the desired CD appears. When the desired CD appears, rotation can be stopped and the desired CD removed from the rack.

Notwithstanding that the disclosed rack could store a great many CDs or other objects and has met with great consumer success, there is a need for a rack that can store DVDs. Further, since DVDs are often used in an environment with subdued ambient lighting, there is a need for a DVD rack that can illuminate DVDs retained by the rack, for ease of selection in such an environment. There is a need to promote such ease of use by, for example, providing an option for hand-operated and/or foot-operable variable speed, and variable direction, and stop and go operation of the rack. Enlarging the holding capacity of such racks typically requires a larger base, for reasons of stability. However enlarging the base can require a larger carton in which to ship such racks, thus adding to the overall cost of bringing the product to the marketplace. Thus, there is a need for base mechanism that provides the requisite stability for a rack, yet does not require a larger shipping carton. Further such rack should provide an option to automatically cease rotation upon scan code recognition of a DVD or other retained object, or upon voice command from a user. Finally, it is preferred that such rack have the ability to be electronically daisy-chained to other such racks.

Unlike CD jewel boxes, DVD boxes are commonly manufactured in two different configurations. A first common DVD box configuration is an Amaray Safe Box. The Amaray Safe Box is a 7.52"×5.35"×0.6" box that has a push-button locking tray hub for easy disc release, and clamps for multi-page booklets. A second common DVD box configuration, often known as a Snapper Box, is similar to the Amaray Safe Box, but is 7.47"×5.58"×0.53" in size. A motorized rack to hold DVD boxes preferably should be able to store both sizes of DVD boxes. Further, as the holders for the DVD cases are necessarily larger than holders for CD cases, it would be desirable to ship the rack with such holders in a compact format, thus saving on the cost of the container that holds the rack and in shipping costs. The present invention provides such a rack.

SUMMARY OF SOME OF THE ASPECTS OF THE INVENTION

In the preferred embodiments of the invention, storage capacity in a rack is increased by providing inter-connectable holders that form a rotatable loop or belt. In one embodiment of the invention, each holder retains at least one object such as a DVD box or case which can have various sizes. In another embodiment of the invention a multi-loop rack comprises side-by-side loops formed of inter-connectable holders that each retain a single object. In still another embodiment, each holder can retain at least two such objects in a side-by-side configuration. Thus, a single loop of inter-connected holders can be created in which more than one object is retained in each holder. In these embodiments, retained objects can be viewed by a user during loop rotation, and loop rotation can be halted by the user when a desired retained object is observed. At the top regions of the loop rotation, the retained objects are moved through a fan-out region in which the object can be especially easily removed from the halted loop, e.g., by grasping with the user's fingers.

Each holder embodiment preferably includes first and second walls or fingers that are retained a spaced-apart distance from each other that is sufficient to admit and retain at least a portion of at least one such object. To improve retention, a holder-facing surface of one of the walls or fingers travels the entire width of the DVD case, and includes a retention member that prevents the DVD case from sliding out of holder. In other embodiments, the retention member is slidably engaged with the finger so that it can be adjusted to an up position or a down position, or to the specific width of the DVD. A holder that is sized to retain two objects will be approximately twice the width of a single-object holder. A two-object holder can include a partition wall or finger that separates at least a portion of facing surfaces of two objects retained in the holder.

Each holder further includes at least one male (or first-type) interconnect mechanism or coupling and at least one female (or second-type) interconnect mechanism or coupling. These mechanisms are formed such that the male mechanism on a first holder interlocks with an adjacent second holder's female mechanism, and the female mechanism on the first holder interlocks with an adjacent third holder's male mechanism. The rotatable loop formed by inter-connecting such holders may be said to be modular in that loop length can be varied by adding or subtracting (i.e., removing) holders. Each holder preferably is integrally formed as a single piece component.

The rotatable loop or loops are preferably disposed within a rack that includes left and right vertical supports that attached to a base member. A rack embodiment comprising separate loops (i.e., two loops) formed from single-object interlocked holders can include a third vertical support intermediate the two side-by-side single-object holders. Although the loop or loops could be manually rotated, for example with a hand crank or simply by moving the holders with a hand, more preferably the loop(s) are rotatable using an electric motor. In one embodiment, there is a single sprocket rotation axis near the top fan-out (or turnaround) loop region and a single sprocket rotation axis near the bottom fan-out (or turnaround) loop region. However two or more parallel sprocket rotation axes could instead be provided in either or both fan-out regions. Further a single sprocket rotation axis, without an axis at the bottom is also contemplated.

The motor is powered by batteries (e.g., mounted in the base member), or may be powered by an external source. One or more user-operable controls governs rotational direction and speed of the loop(s) formed by the interconnected holders. One such control can be located on one of the vertical support members for use by the user's hand. Alternatively or additionally, equivalent controls can be disposed on the base member for use by the user's feet.

The base member preferably has user-attachable base side members that, when attached, enlarge the effective footprint of the overall base structure, thus enhancing stability of the rack. However, when the rack is shipped by the manufacturer, the base side members can be detached, which permits shipment to occur in a smaller and less expensive shipping carton. In another embodiment, each holder includes an adjustable retention tab that is pushed into its most compact height during shipping to minimize the size of the shipping carton.

The rack includes an optional light unit comprising, for example, several white light-emitting diodes (LEDs) and a diffuser. The light unit can be located near the fan-out region of the rack, preferably to an upper portion of one of the vertical side members. When the motor is energized, the light source illuminates objects retained by the holders for ease of viewing and selection, and can continue to illuminate for a period of time (e.g., a minute or so) after motor rotation is halted by the user. Optionally, the light unit can be provided with an optical scanner that scans bar code information attached to and identifying contents of objects retained by the rack. An optional remote control device can be user operable to command electronics associated with the rack to halt loop rotation when the scanner recognizes a bar code desired by the user, the desired bar code having been communicated preferably remotely by the user to the electronics. If desired, the scanner unit could be augmented with a voice recognition system that would halt loop rotation when a user-vocalized identified object was recognized by the scanner. Alternatively, if the user were sufficiently close to the rack to directly see the desired object, a voice command could be used to halt rack rotation to facilitate user removal of the desired object from the rack. A rack may be electronically daisy-chained to one or more other racks such that user commanded rotation of one rack causes loops in all racks to rotate.

Other objects and advantages of the invention will appear from the following description in which the preferred embodiments have been set forth in detail, in conjunction with the accompanying drawings and in the claims.

BRIEF DESCRIPTION OF THE DRAWINGS

FIGS. 10A–10D are various perspective views of an object holder that includes an adjustable retention member, according to an embodiment of the present invention; FIGS. 10E and 10F are, respectively, rear and front perspective views of the adjustable retention member of FIGS. 10A–10D;

FIG. 11A is a side elevation view illustrating several interconnected holders, according to an embodiment of the present invention FIG. 11B is a cross-sectional view of the interconnected holders shown in FIG. 11A;

FIG. 15A is a perspective view of an embodiment of a double object holder for retaining objects; FIG. 15B is a perspective view of another embodiment of a double object holder for retaining objects; FIG. 15C is a rear perspective view of the double object holder shown in FIG. 15B;

FIG. 16A is a perspective view of an embodiment of a double-loop DVD rack comprising interconnected single object holders; FIG. 16B is a perspective view of the partially assembled embodiment of FIG. 16A; FIG. 16C is a perspective view of a second embodiment of a DVD rack comprising interconnected double object holders; and FIGS. 17A–17D; FIG. 17A is a schematic side view depicting a DVD rack with two rotation axes; FIG. 17B is a schematic side view depicting a DVD rack with two rotation axes and vertical support members that are enlarged adjacent the base member; FIG. 17C is a schematic side view depicting a DVD rack with three rotation axes and vertical support members that are enlarged adjacent the base member; and FIG. 17D is a schematic side view depicting a DVD rack with four rotation axes and vertical support members that are enlarged adjacent the base member.

DETAILED DESCRIPTION OF THE PRESENT INVENTION

Figure 1:
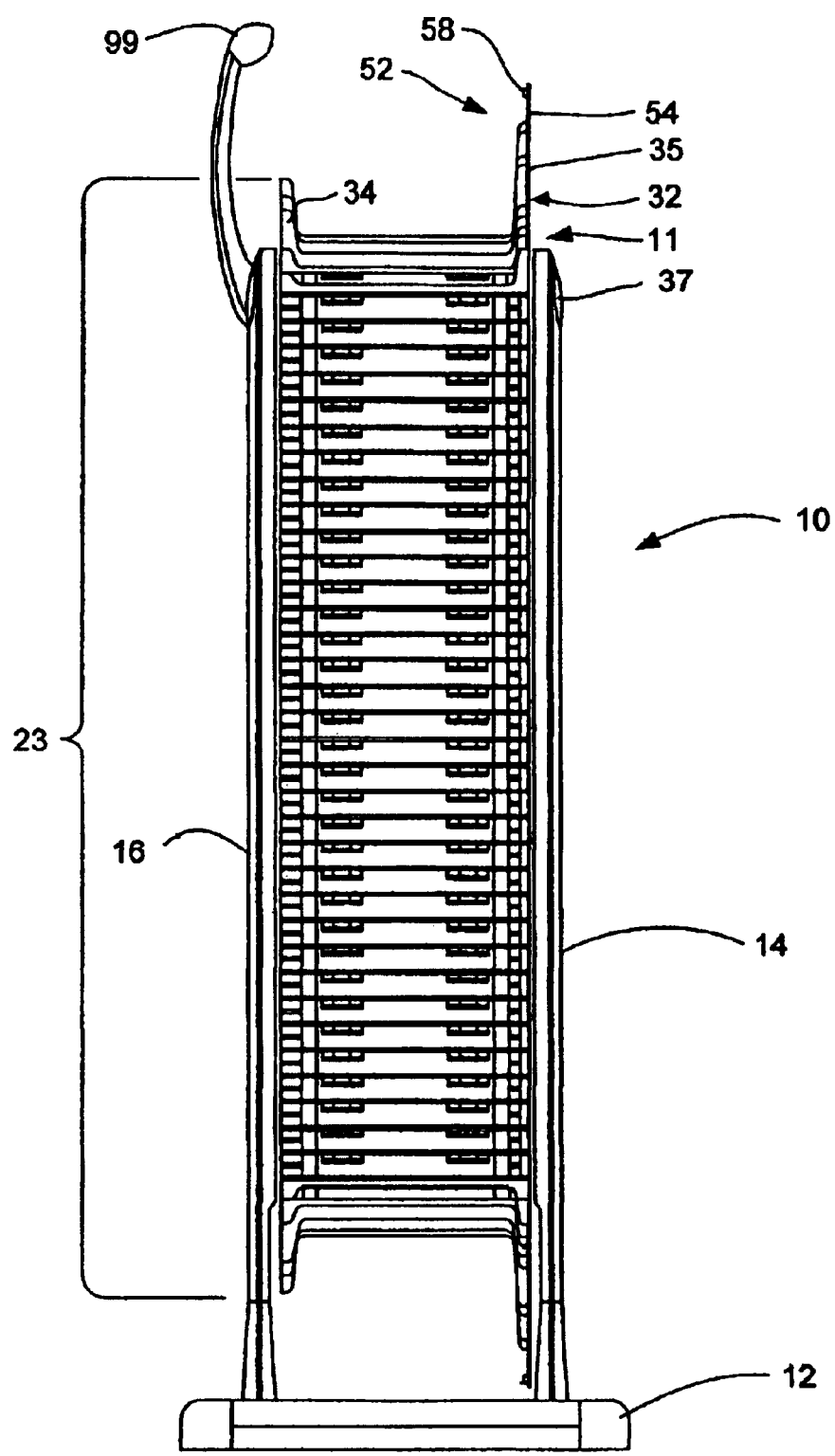
FIG. 1 is a front view of an embodiment of a DVD rack, according to the present invention.
Figure 2:
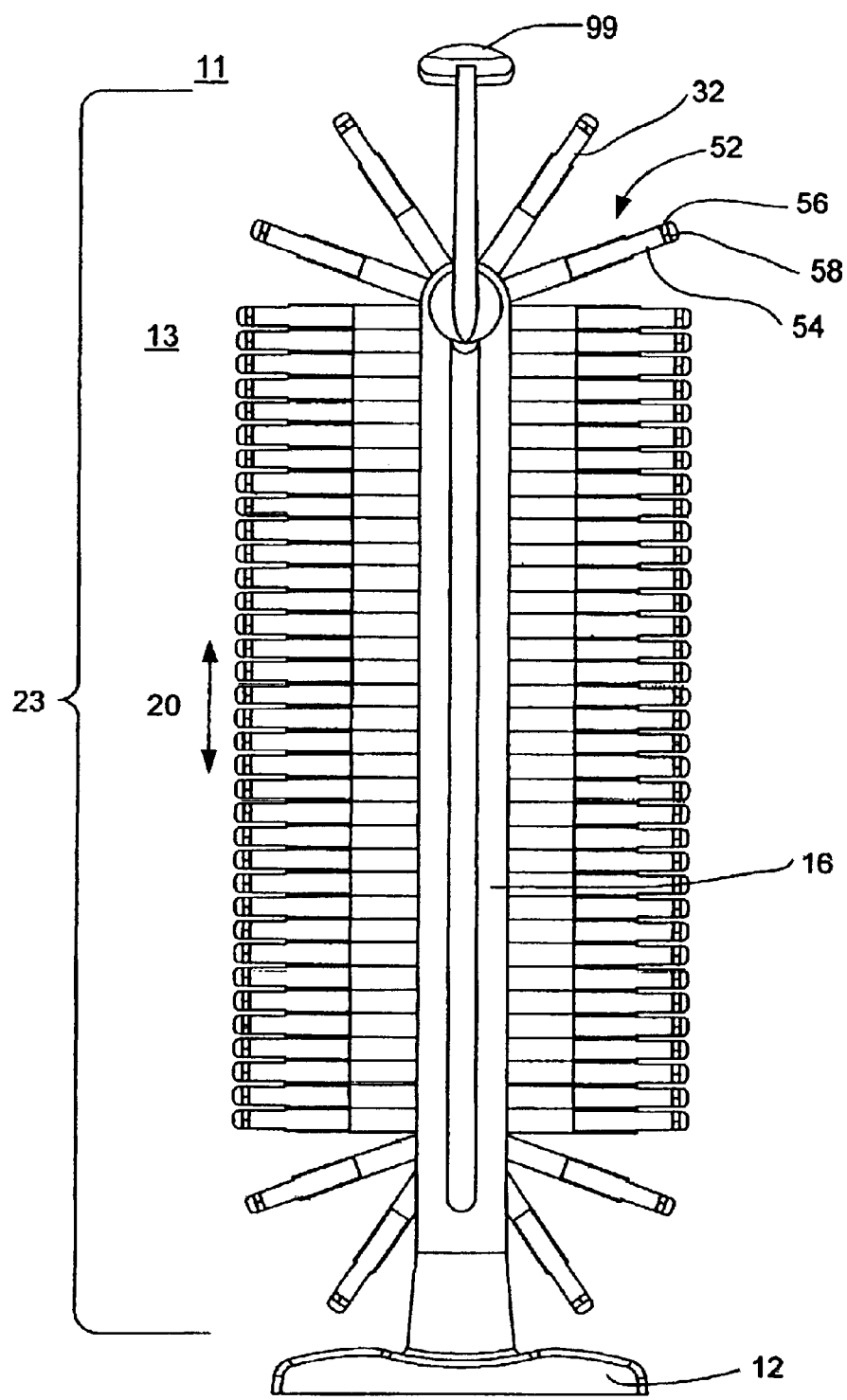
FIG. 2 is a side view of the DVD rack shown in FIG. 1.

FIGS. 1–2 illustrate a first embodiment of a tower-like rack 10 according to the present invention capable of storing multiple containers (for example, DVD boxes) 18 (FIG. 13) containing, for example, DVDs on a conveyer-like apparatus. The rack 10 (also referred to as tower 10) is a device for retaining, in a preferred embodiment, up to one hundred or more DVDs in their cases. The rack 10 includes multiple holders 32 that are linked together to form an endless belt 23 (also referred to as loop 23). As described later herein, the belt 23 of linked-together holders 32 can be driven by an electric motor 28 (see FIG. 4).

Figure 3:
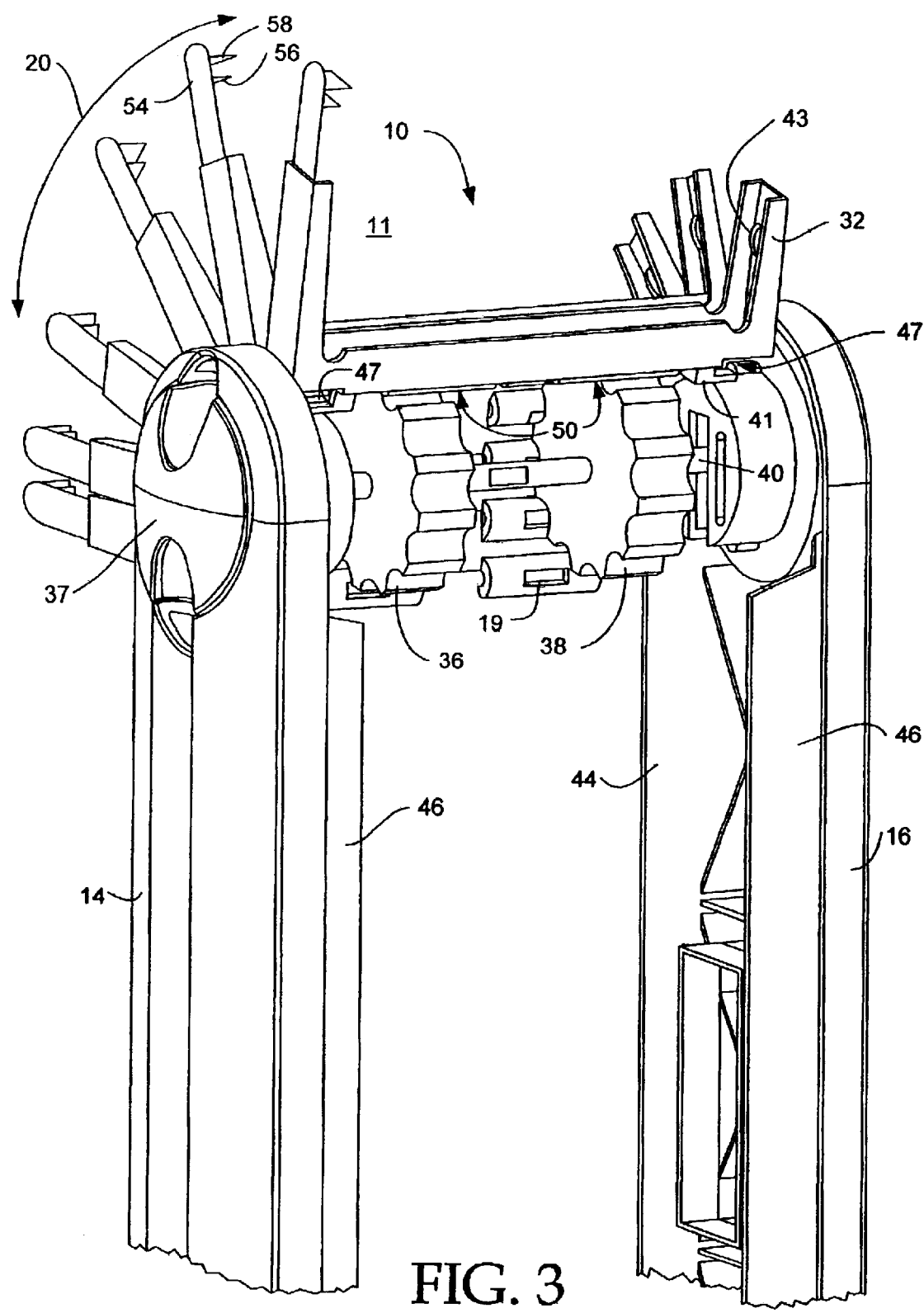
FIG. 3 is an enlarged detailed perspective view of an upper portion of the DVD rack.

Appropriate controls, for example knob 37 (FIG. 3), connected to an electrical switch (not shown) can be used to connect motor 28 (FIG. 4) to (1) a DC voltage of a first polarity, (2) a DC voltage of an opposite second polarity, (3) to adjust the magnitude of the voltage of either polarity, or (4) to apply no DC voltage at all. The result is to cause the belt or loop 23 to rotate in a clockwise or counterclockwise direction (e.g., as indicated by arrows 20, FIG. 3), to adjust motor rotational speed (e.g., from high to low), or to halt all movement of the belt 23 by disconnecting the operating voltage from the motor 28. As shown in FIG. 3, the control 37 can be rotated clockwise to cause the loop 23 to rotate clockwise, or counterclockwise to cause the loop 23 to rotate in a counterclockwise direction. In an embodiment, the more that the control 37 is rotated in any direction, the smaller the amount of voltage that is applied to the motor 28 and the slower the loop 23 rotates in the desired direction. Conversely, in an alternative embodiment, the more that the control 37 is rotated in a desired direction of rotation with the loop, the faster that the belt or loop 23 rotates in that direction. Control 37 enables a user to cause belt rotation until the desired object (typically a DVD enclosed within a container 18) reaches the top region 11 of the rack 10. At the top region 11 (as well as at the bottom most region) the holders 32 (and thereby the containers 18) fan out, which facilitates the manual removal of containers 18 from the rack 10 by a human hand. Normally, in the vertical belt regions 13, the containers 18 are retained so closely to one another that their removal from the holders would be difficult. However, the fan out that occurs in turnaround region 11 (also referred to as the fan-out region 11) eases user-removal of a desired object 18 from the rack 10.

Racks 10, such as depicted in FIGS. 1, 2, 13, and 14, that rotate a linked-together loop 23 formed from holders 32 that retain only a single object 18 will also be referred to herein as single loop racks. As will be discussed in more detail below (e.g., with reference to FIG. 16B), some embodiments of the present invention have multiple loops.

As shown in FIG. 1, the continuous belt or loop 23, formed from linked-together holders 32, preferably is vertically disposed between a pair of opposed spaced-apart vertical supports 14 and 16, that are attached to a rack base 12. An alternative mounting configuration to that shown in FIG. 1 can include affixing loop 23 for rotation against a vertical structure such as a wall. Although the preferred embodiments will be described with respect to electric motor loop rotation, the motor 28 could be replaced (or augmented) by a hand crank that a user could rotate to rotate the belt or loop 23. The various structures are preferably fabricated from an inexpensive, light weight material such as ABS-type plastic, although other materials may be used.

Figure 4:
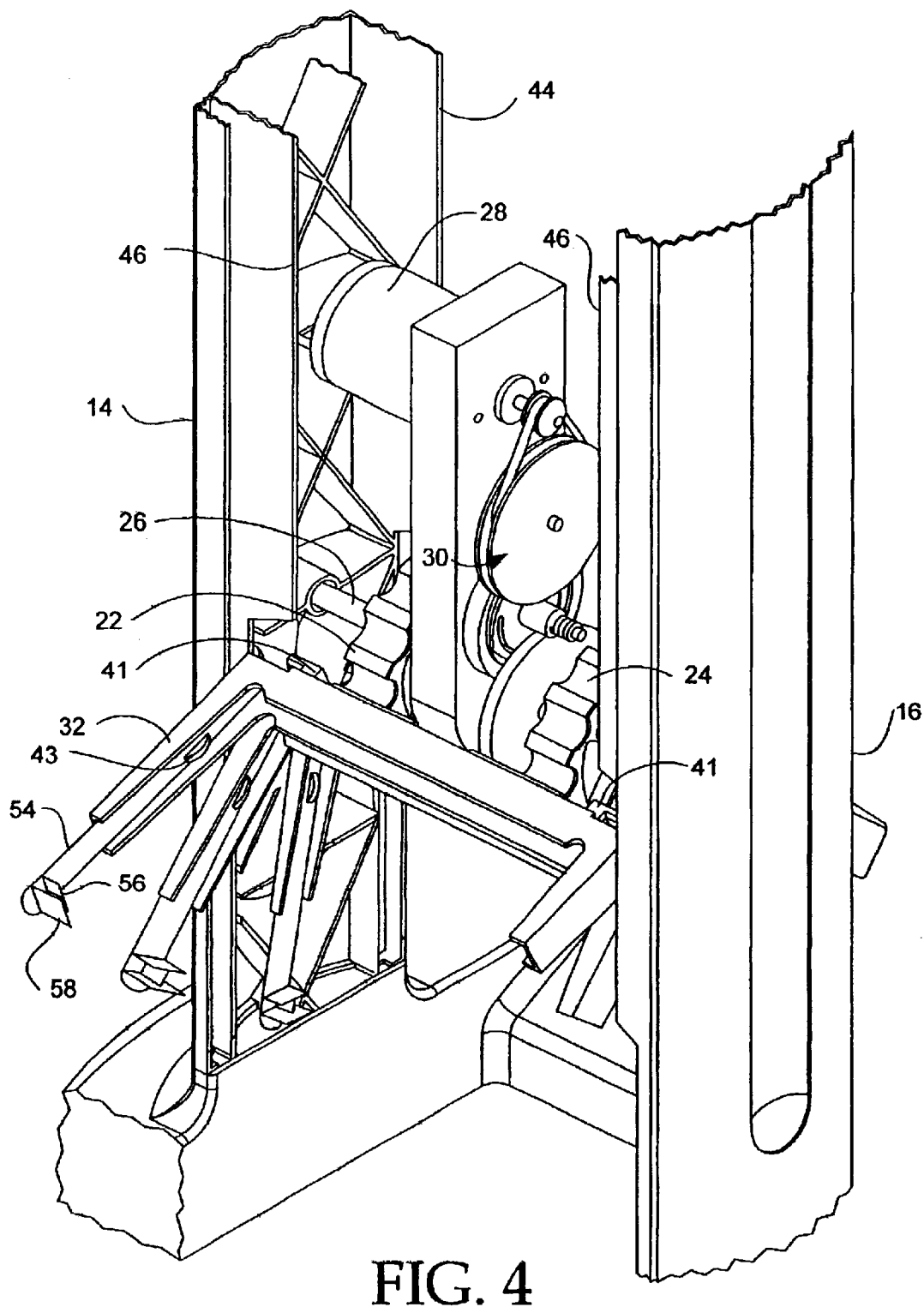
FIG. 4 is an enlarged detailed perspective view of a lower portion of the DVD rack.
Figure 16A:
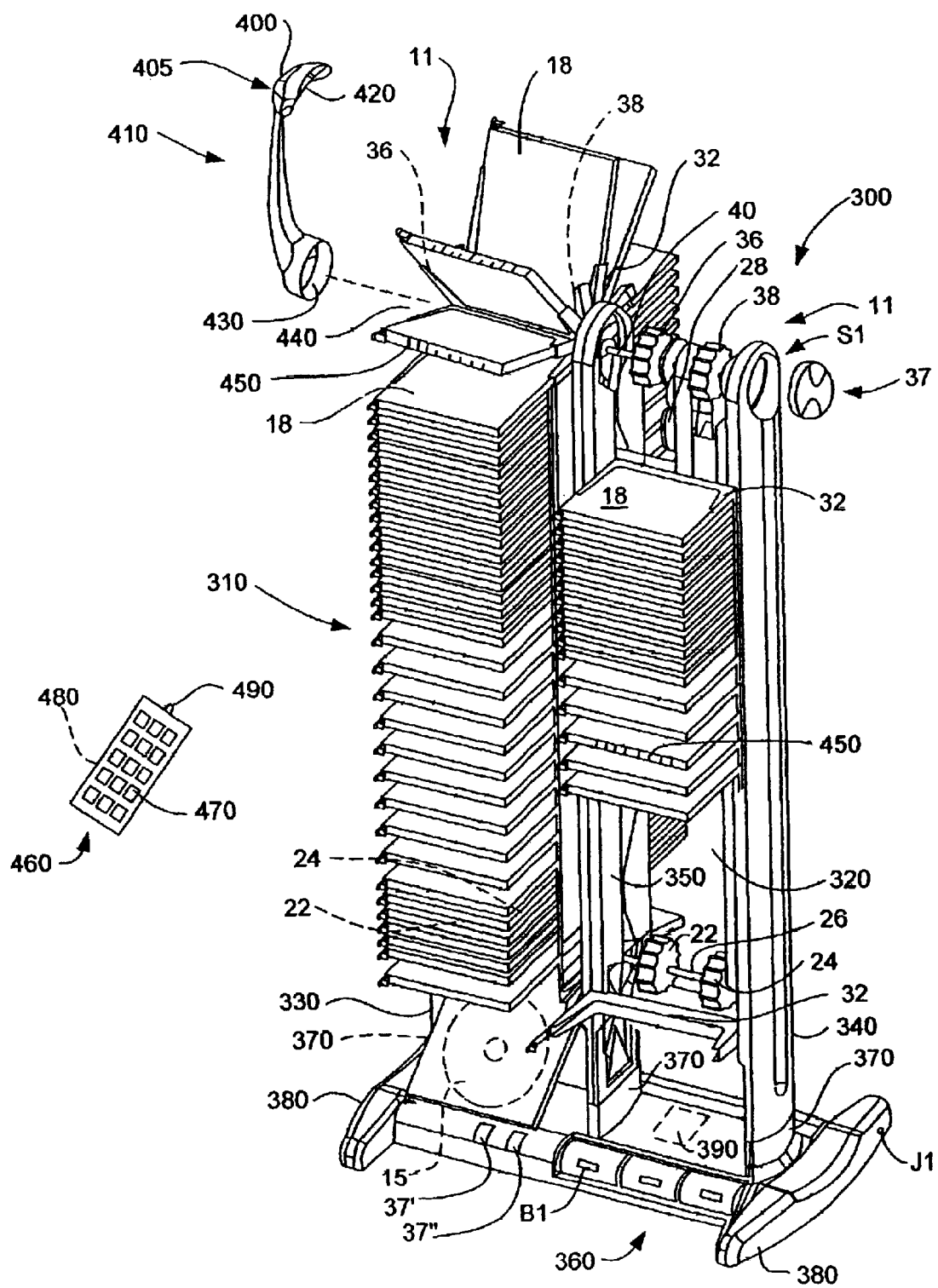
FIGS. 16A–16C.
Figure 16B:
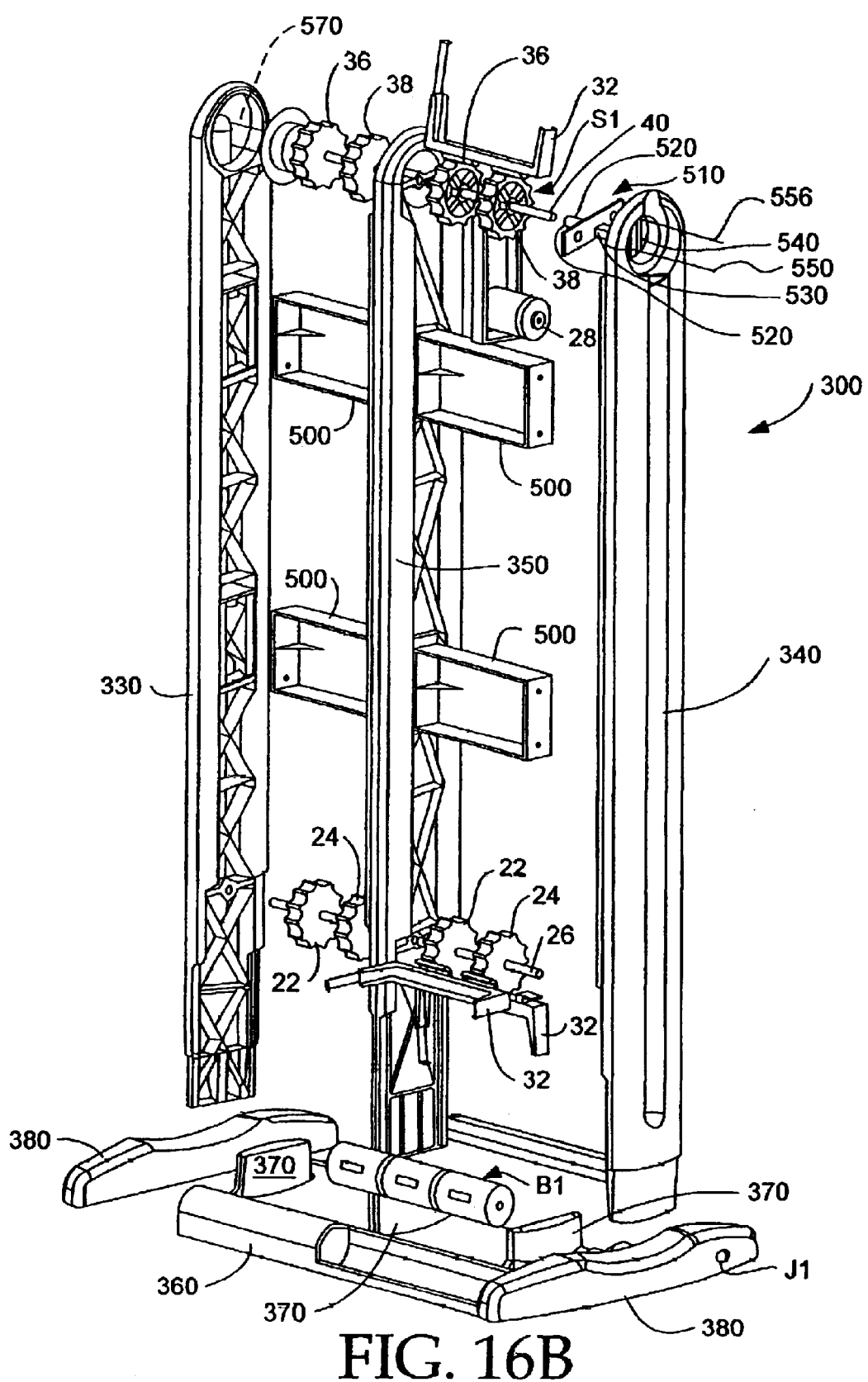

Referring now to FIG. 3, drive sprockets 36, 38 rotate on a shaft 40 journaled between vertical supports 14 and 16. The shaft 40 and sprockets 36, 38 are disposed within the upper portion of rack or tower 10 and are rotated by motor 28 (see FIG. 4), e.g., by use of control 37 (see FIG. 1). FIG. 4 provides further details of the drive system. In an embodiment of the present invention, motor 28 drives lower drive sprockets 22, 24 on shaft 26 using a pulley arrangement 30. Motor 28, sprockets 22 and 24, and pulley 30 are shown as being disposed near the base 12 of rack 10, thereby lowering the center of gravity of rack 10. Alternatively, motor 28 can be located near the top of rack 10 (e.g., as shown in the embodiment of FIG. 16B). Even though only a single upper sprocket can be used (e.g., centered on shaft 40), the use of the pair of sprockets 36 and 38 provides a more balanced drive to the continuous loop 23 formed by inter-connected holders 32. To ensure sufficient tension in the loop, bearing blocks that act as shims can be used to mount shaft 40 (and/or shaft 26). Alternatively, the motor 28 (along with the pulley arrangement 30) can drive the upper sprockets 36, 38, rather than the lower sprockets 22, 24. In such an arrangement, the lower sprocket, 22, 24 can optionally be eliminated and the lower fan out region can hang, rather than being engaged about sprockets. Such hanging would ensure sufficient tension in the loop 23.

Figure 6:
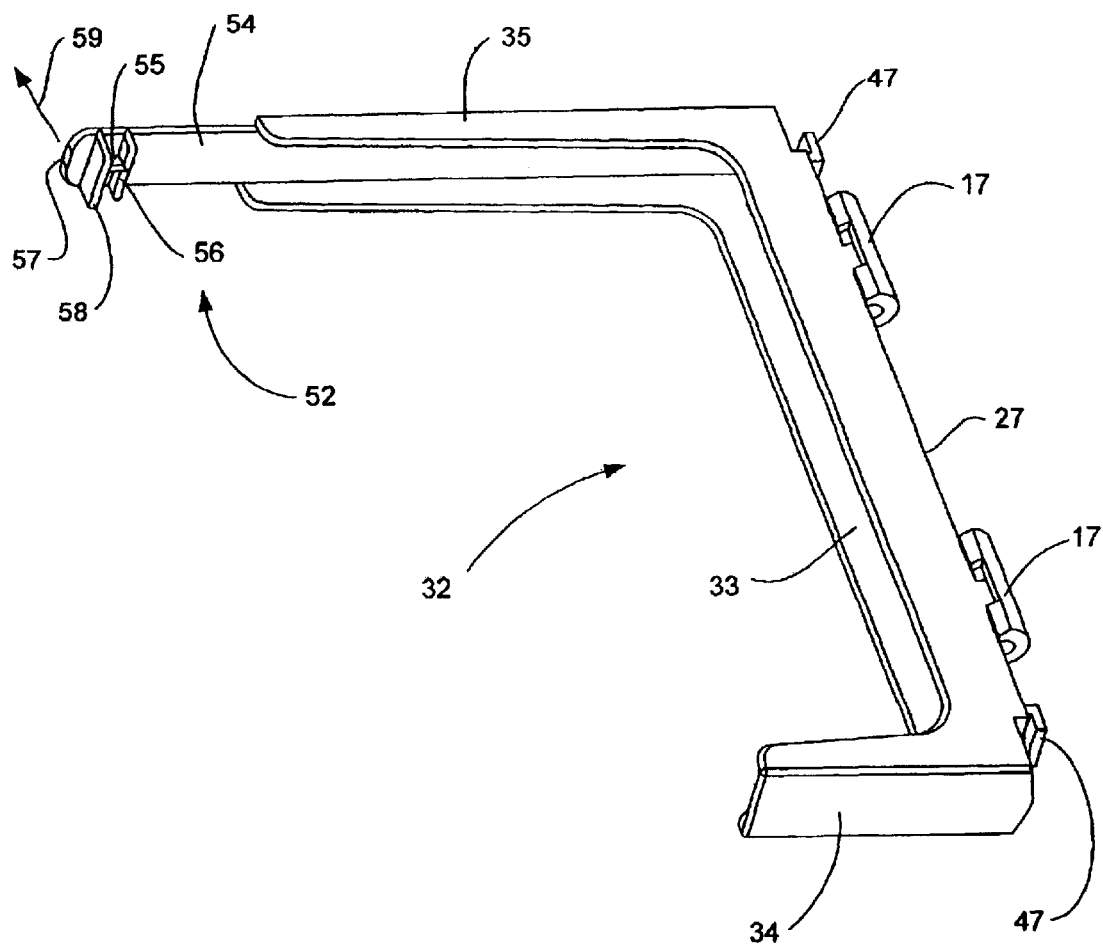
FIG. 6 is another perspective view of the single object holder of FIG. 5.
Figure 9:
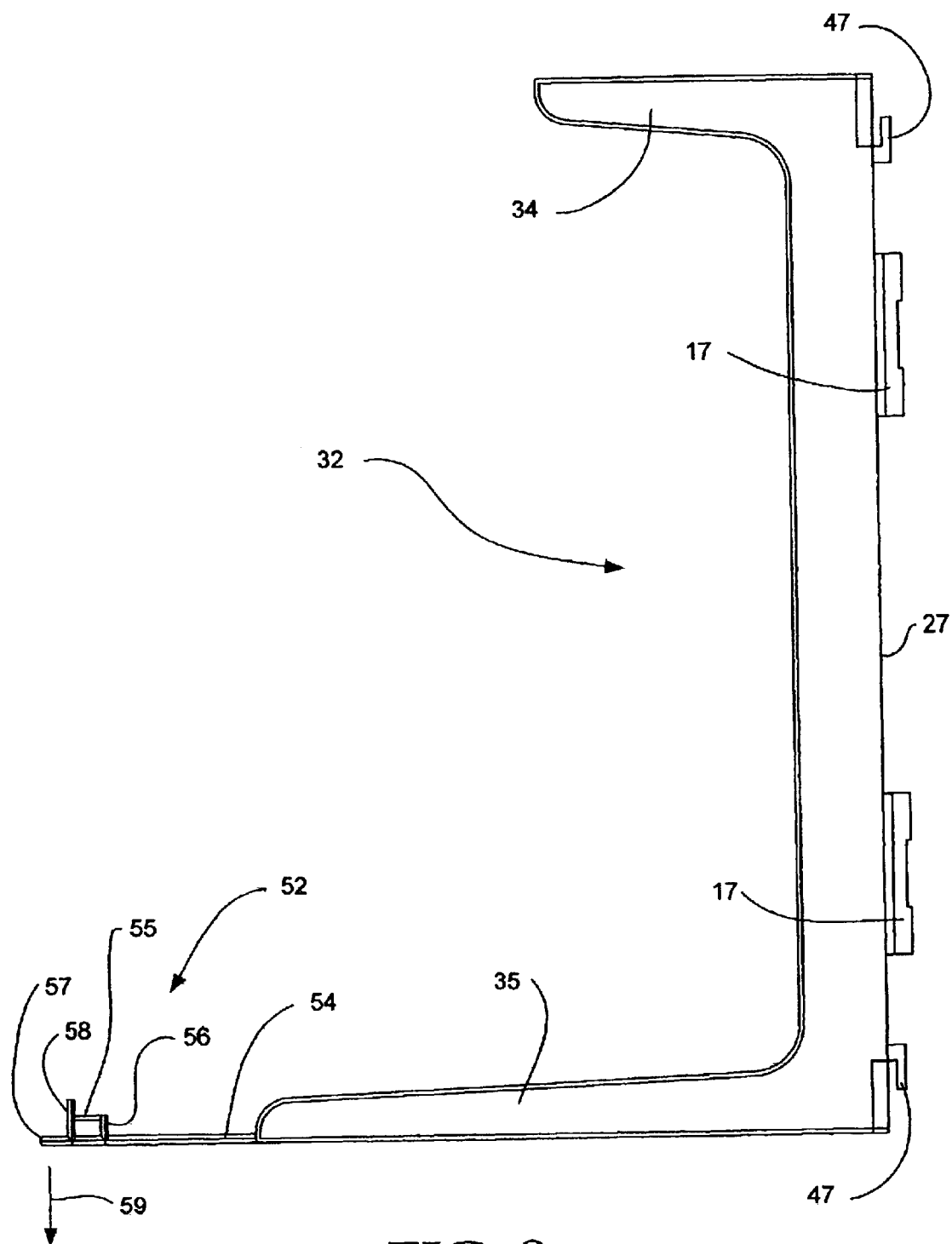
FIG. 9 is a top view of the single object holder of FIG. 5.

Referring to FIGS. 3 and 4, vertical side supports 14 and 16 preferably include rails 44 and 46 to effectively guide and retain continuous loop 23 in cooperation with the slidable interlock units 47 (FIG. 6) formed on a base surface 27 (which faces inside rack 10) of each holder 32. As can be seen in FIGS. 6 and 9, in accordance with an embodiment of the present invention, interlock units 47 are L-shaped such that they can engage with and slide along rails 44 and 46. Together these components facilitate retained vertical up or down sliding travel of holders 32. As shown in FIG. 3, rails 46 and 44 terminate before upper turnaround region 11 (and also terminate before the bottom turnaround region) to allow the loop 23 to curve (e.g., by turning about the sprockets).

Objects or containers 18 are releasably retained by a flexible coupling of holders 32, as described with reference to FIGS. 5–10, which depict the holder 32 in further detail and with different orientations. Each holder 32 include a base 33 from which extend a pair of fingers 34 and 35 that are spaced-apart a distance sufficient to receive at least one edge portion of a container 18 in a slot-like space formed therebetween. Fingers 34 and 35 receive the opposite (e.g., left and right) edges (or sides) of a DVD case or container that is inserted into the slot-like space formed between the fingers. As previously mentioned, a DVD case has two common configurations. To ensure that both sizes of DVD cases may fit into the holder 32, opposing faces of fingers 34 and 35 of each holder 32 are spaced approximately 7.6" apart.

These fingers 34 and 35 promote the receiving and retaining of a DVD case 18, which is retained until selected and removed from the holder 32 by a user. As shown in FIGS. 5–9, each holder 32 includes a short finger 34 and a long finger 35. In a preferred embodiment, the short finger 34 travels approximately one-third across the top or bottom surface, and the long finger 35 travels approximately three-fourths across the opposite surface when a DVD case 18 is inserted into the holder 32. It is within the scope and spirit of the invention for the fingers 34 and 35 to extend various other distances across a case 18. The fingers 34 and 35 are substantially parallel to each other in order to conform to the shape of the DVD case 18.

Figure 5:
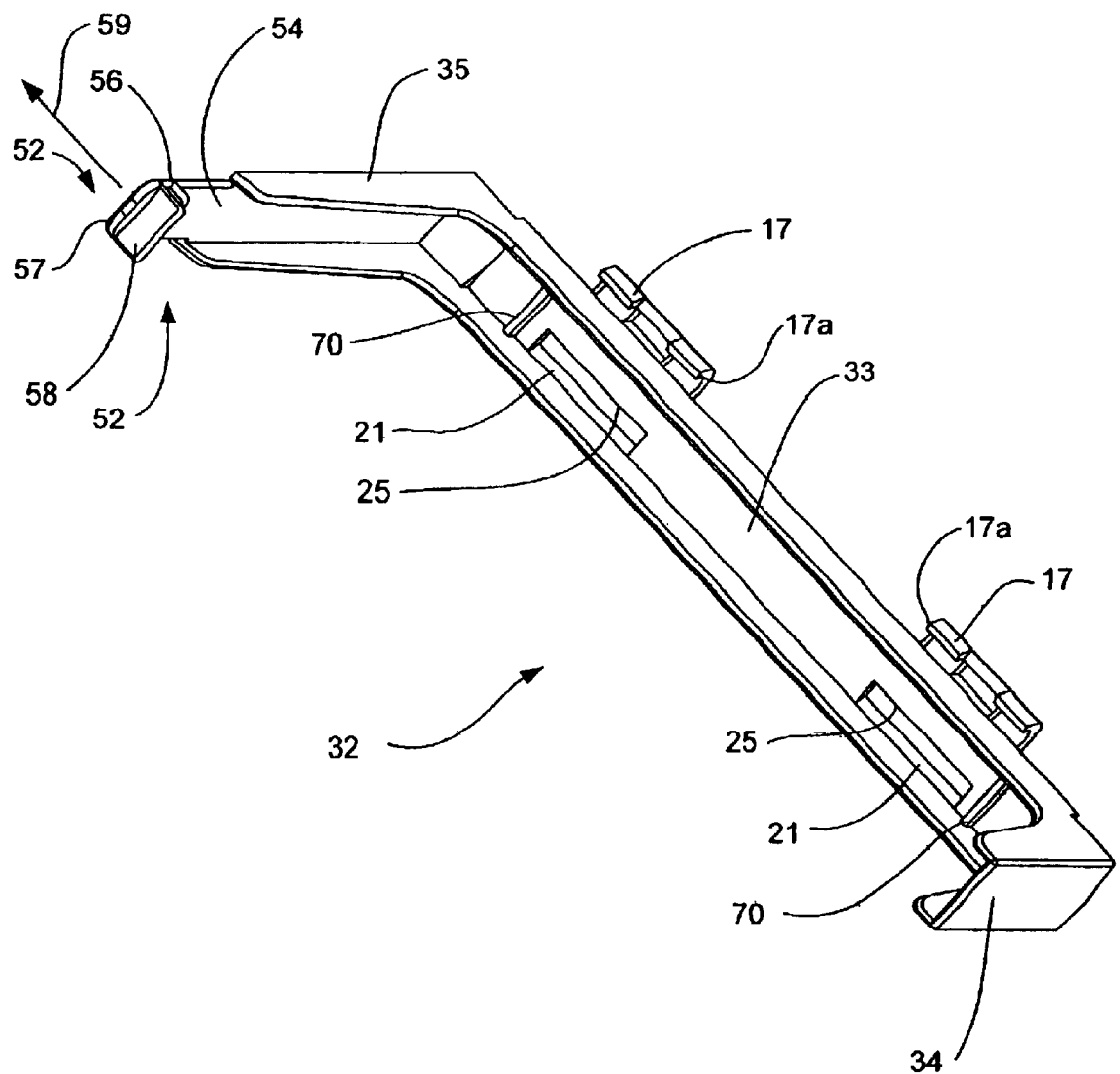
FIG. 5 is a perspective view of a single object holder, according to an embodiment of the present invention.

Each holder 32 includes a retention member 52 extending from the finger 35. The retention member 52 includes a platform 54, having a first retention tab 56 and a second retention tab 58 extending from the platform 54. The retention member 52 is designed to hold the container 18 within the holder 32 as it rotates. The platform 54 is substantially the same width as the base 33. In general, the platform 54 must be long enough so that tab 56 or 58 will engage a top corner of the DVD case 18 while the case 18 is retained within the holder 32. The platform 54 is preferably flexible such that it can be bent in a direction specified by arrow 59 to allow for the insertion and removal of a container 18. The platform 54 (and other features of retention member 52) can be integrally formed with finger 35 (and possibly the other portions of holder 32) as shown in FIGS. 5 and 6. In such an embodiment, the platform 54 can be thinner than finger 35 so that platform 54 is flexible. The first tab 56 and second tab 58 extend inward from (and substantially perpendicular to) the platform 54 towards the short finger 34. As best shown in FIG. 9, the second tab 58 is located above the first tab 56 (i.e., a further distance from the base 33). The second tab 58 also extends out from the platform 54 further than the first tab 56.

A benefit of the first finger 34 only extending about one third the length of a container 18 is that a container 18 can be angled into the slot-like space (defined between fingers 34 and 35) without requiring a person to pull back retention member 52. This can be accomplished by lowering first the corner of the container 18 located closest to the first finger 34. As the container 18 is angled into the slot-like space, an edge of the container 18 pushes against second tab 58 and bends back retention member 52 (in the direction specified by arrow 59). Once the container 18 is fully inserted into the holder 32, the first and/or second tabs 56, 58 snap over the container 18 and prevent the container 18 from sliding out of the holder 32, as is described in more detail below. However, a person can pull back retention member 52 (e.g., using a finger tab 57, discussed in more detail below) to assist in the insertion of the container 18.

The first and second tabs 56 and 58 are located at different heights and have unequal lengths so that either of two different sized DVD cases 18 can be retained in the holder 32. Depending on the size of the DVD case 18, either the first tab 56 or both tabs 56, 58 engage a portion of the DVD case 18. When a first sized DVD box 18 (e.g., 7.51"×5.35"× 0.6") is placed into the holder 32, the case or box 18 is completely contained within the area defined by the first tab 56, the base 33, and the fingers 34 and 35. The height from the base 33 to the first tab 56 is preferably slightly greater than the shorter length of the first sized DVD case 18 (e.g., slightly greater than 5.35"). The first tab 56 extends along a portion of the case's outer edge, preventing the case 18 from sliding out of the holder 32 as it rotates.

Figure 8:
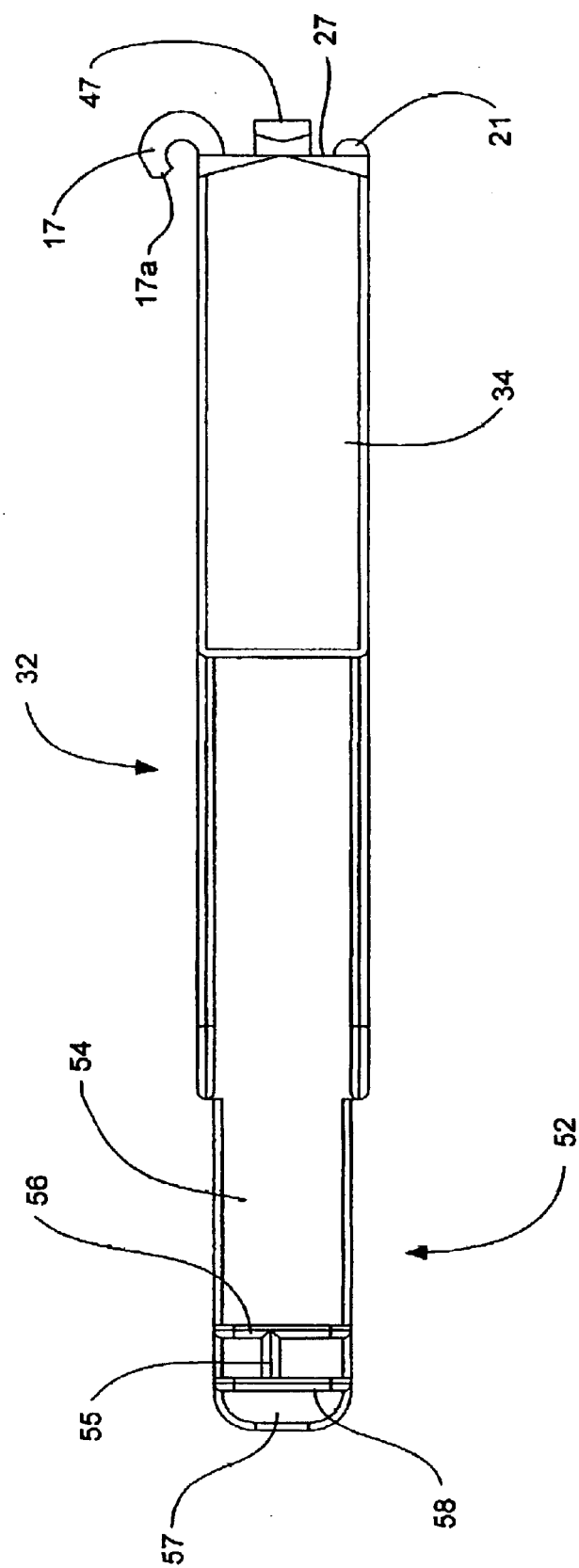
FIG. 8 is side elevational view of the single object holder of FIG. 5.

When a second sized DVD case 18 (e.g., 7.47"×5.58"× 0.53") is inserted into the holder, the DVD case 18 is completely contained within the area defined by the second tab 58, the base 33, and the first and second finger 34 and 35. The height of the second tab 58, from base 33 is preferably slightly greater than the shorter length of the second sized DVD case 18 (e.g., slightly greater than 5.58"). Accordingly, the second tab 58 extends along a portion of the outer edge of the DVD case 18, preventing the DVD case 18 from sliding out of the holder 32 as it rotates. In this situation, both the first tab 56 and second tab 58 engage the case 18. The first tab 56 engages the side of the DVD case facing the long finger 35 and provides a positive force that pushes the DVD case 18 against the short finger 34. This positive force creates a higher frictional force between the DVD box 18 and the short finger 34. In general, the platform 54 acts as a cantilever, predisposed to return to its original position (e.g., extending linearly from the finger 35). As shown in FIGS. 6, 8 and 9, a rib 55 extends from platform 54, between the first tab 56 and the second tab 58, the same distance as does the first tab 56. The rib 55 strengthens the first and second tabs 56, 58. Further, the outer most edge of the rib 55 (i.e., the edge closest to finger 34) rests against (and pushes against) an edge of an inserted second sized DVD box 18.

Once a DVD case 18 is "locked" into a holder 32, it can be "released" by pulling the retention member 52 back and away from the DVD case 18 (i.e., in the direction specified by the arrow 59). In a preferred embodiment, the retention member includes a finger tab 57 that protrudes above the second tab 58. The finger tab 57 is useful for enabling a user (i.e., person) to bend the retention member 52 (in the direction specified by the arrow 59) when inserting or removing a container 18.

Figure 11A:
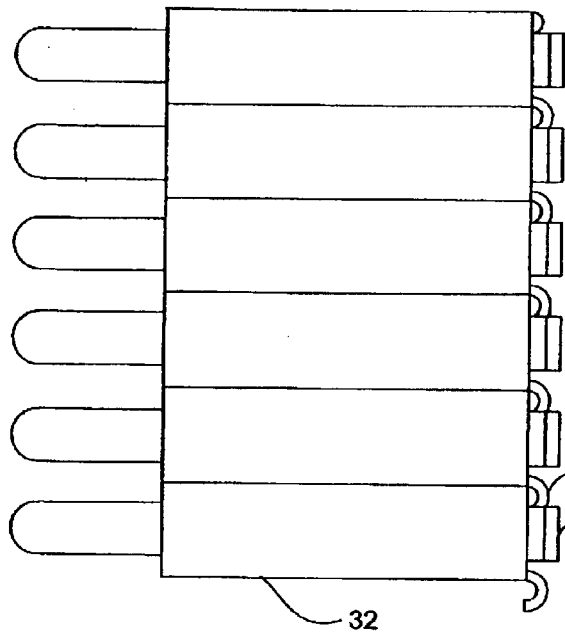
FIGS. 11A–11B.
Figure 11B:
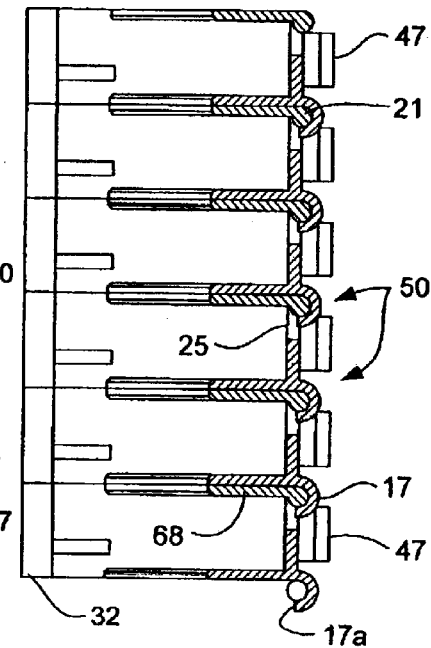
Figure 12:
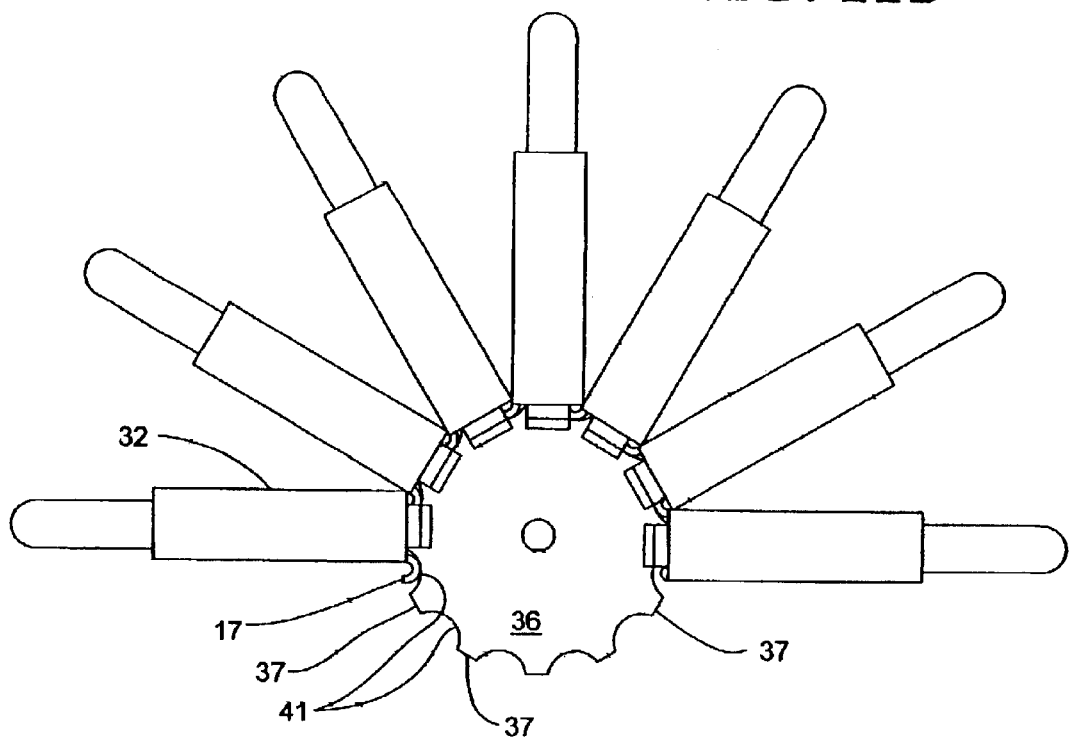
FIG. 12 is a side elevation view illustrating the holders of FIG. 11A, as they would be rotated about a sprocket.

The formation of belt 23 by snapping-together adjacent holders 32 will now be described. In overview, each holder 32 includes hinged coupling means or mechanism 50 (FIG. 11B) that allows adjacent holders to be flexibly coupled to one another. In this fashion, using nothing but the holders themselves, a continuous loop or belt 23 of linked-together (or hinged-together) holders 32 is formed, for example, as shown in FIGS. 11A and 11B. The coupling mechanism 50 creates a belt 23 of holders that is sufficiently flexible to permit the loop or belt 23 to turn around on sprockets (e.g., sprocket 36, as shown in FIG. 12) at, for example, turn-around region 11 shown at the top of FIG. 1. The use of a snap-together type coupling permits easy assembly of the continuous loop or belt 23 using nothing but the holders 32 themselves. Further, as described herein, the snap-together type coupling contributes to the modular nature of rack 10 by allowing additional holders 32 to be added to expand the rack storage capacity. This expansion capability is described below in more detail with reference to FIG. 14.

Figure 7:
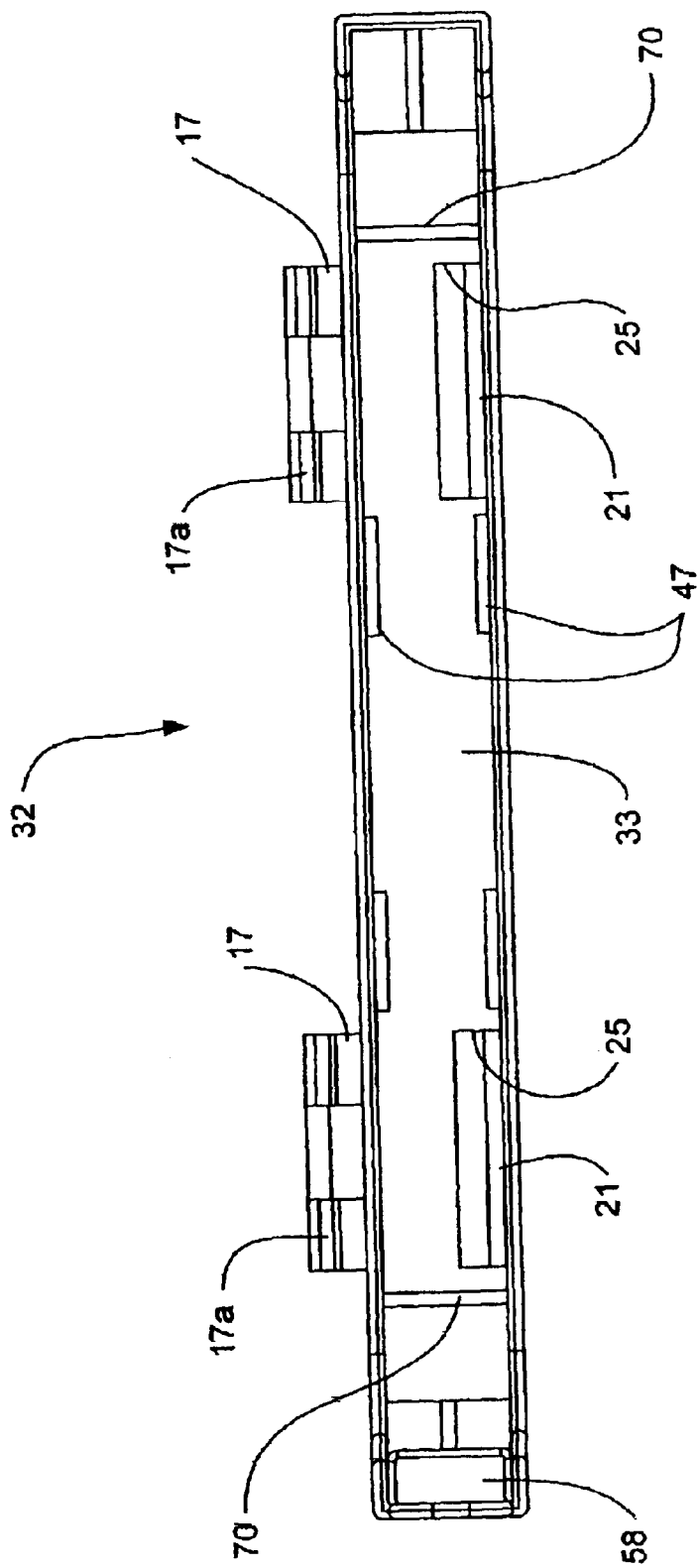
FIG. 7 is an end view of the single object holder of FIG. 5.

Referring again specifically to FIGS. 5–9, each holder 32 includes at least one of each of (and preferably two of each of) a male or ball or cylindrical type coupling 21 and socket or female type coupling 17 having a distal end 17a. Preferably, each is formed on the base surface 27 of the holder 32. As best seen in FIGS. 5 and 7, the male couplings 21 and the female couplings 17 are disposed on opposite sides of the base surface 27. The male type coupling 21 is preferably a curved cylindrical shape protruding outwardly from the base surface 27 of the holder 32. The male coupling 21 snaps into a mating female socket 17 on a next adjacent holder 32. The distal end 17a of the female coupling 17 extends or protrudes into a slot 25 adjacent each male coupling 21 when adjacent holders 32 inter-connect.

As shown in FIG. 11B, a snapped-together male and female coupling (from adjacent holders 32) form a hinge 50. Such coupling advantageously helps holders 32 to be sufficiently flexibly interlinked so as to rotate around a sprocket(s) (e.g., sprocket 36, as shown in FIG. 12). In addition, as shown in FIGS. 11A and 11B, such coupling also permits adjacent holders to maintain their physical contiguous relationship with each other when the loop or belt 23 is rotated. Such close relationship advantageously helps rack 10 maximize storage density. As shown in FIG. 11B, the distal end 17a of each female coupling 17 extends into the slot 25 of an adjacent holder 32. The distal end 17a may protrude through the base 33 of the holder 32, especially as adjacent holders 32 fan out. In operation, the female coupling 17 slides or rotates relative to the male coupling 21 as the holders 32 fan out. The distal end 17a of the female coupling 17 travels through the slot 25 until the distal end 17a approaches and contacts the inner wall 68 of base 33. The distance the distal end 17a can travel before contacting the inner wall 68 determines how far the holders 32 may fan out at the turnaround region 11. Each holder 32 has a pair of ribs 70 (FIG. 7) extending upward from the base 33 to prevent a DVD box 18 from contacting the distal end 17a of the female coupling 17 as the female coupling 17 rotates relative to the male coupling 21. The ribs 70 operate as a backstop to prevent a DVD box 18 from interfering with the hinge 50. As described above and as shown in FIGS. 3, 6, 8, 9, each holder 32 preferably includes a pair of somewhat L-shaped interlocks 47 that project from the inward facing surface 27 of holder 32 to engage, for example, rails or guides 44, 46 (FIG. 3) and be guided thereby.

Referring once more to FIG. 12, the curved exterior surface of the female coupling 17 is seated in the groove or valley 41 between adjacent teeth 37 on a sprocket (e.g., sprocket 36, or any of the other sprockets of rack 10). The grooves or valleys 41 (between adjacent teeth 37) are preferably rounded to substantially match and mate with the rounded outer surface of each female coupling 17. Such mating engagement not only makes effective engagement between the continuous loop 23 of interlocked holders 32 and a drive sprocket (e.g., sprocket 36), but advantageously promotes fan out of holders 32 and their associated containers 18 at turnaround regions, e.g., region 11, as shown in FIG. 1. Such fan out permits a desired container 18 to be readily removed from rack 10. As previously mentioned, adjacent holders 32 may fan out relative to each other because of the interaction between the male coupling 21, the slot 25 and the female coupling 17.

Figure 13:
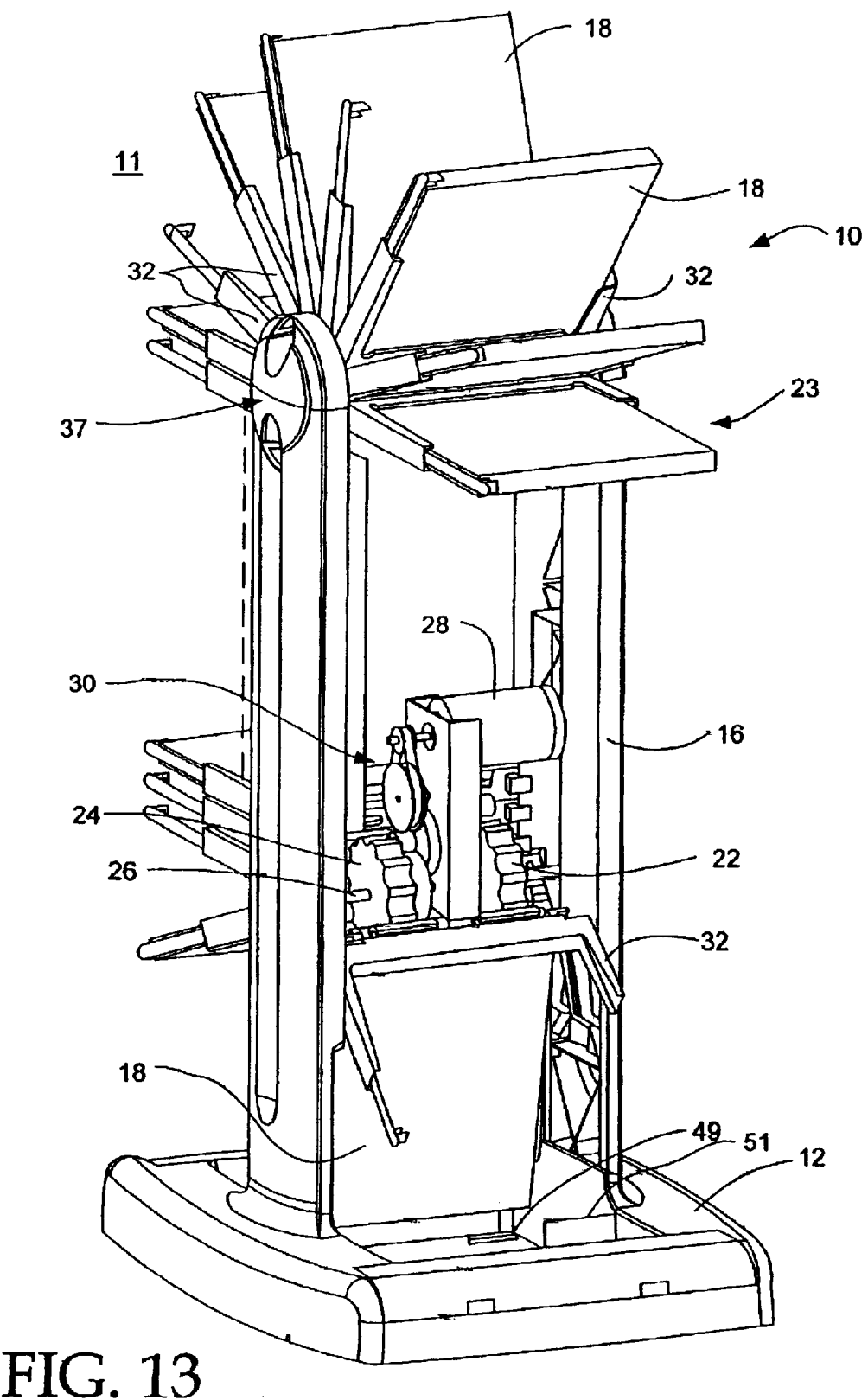
FIG. 13 is a perspective view of the embodiment of the invention shown in FIG. 1 with some of the holders removed to show the interior mechanism of the DVD rack.

FIG. 13 depicts the interior of rack 10 and shows many elements also depicted in FIGS. 3 and 4. Using control 37, the user can cause belt 23 to rotate until a desired object 18, e.g., a DVD case, is moved to upper fan-out region 11, where a fan out of the retained cases occurs. The user then stops belt rotation with control 37, e.g., by interrupting flow of operating power to the motor 28, whereupon the desired case 18 (and DVD within) is easily removed from the holder 32 in region 11, with the user's fingers.

Figure 14:
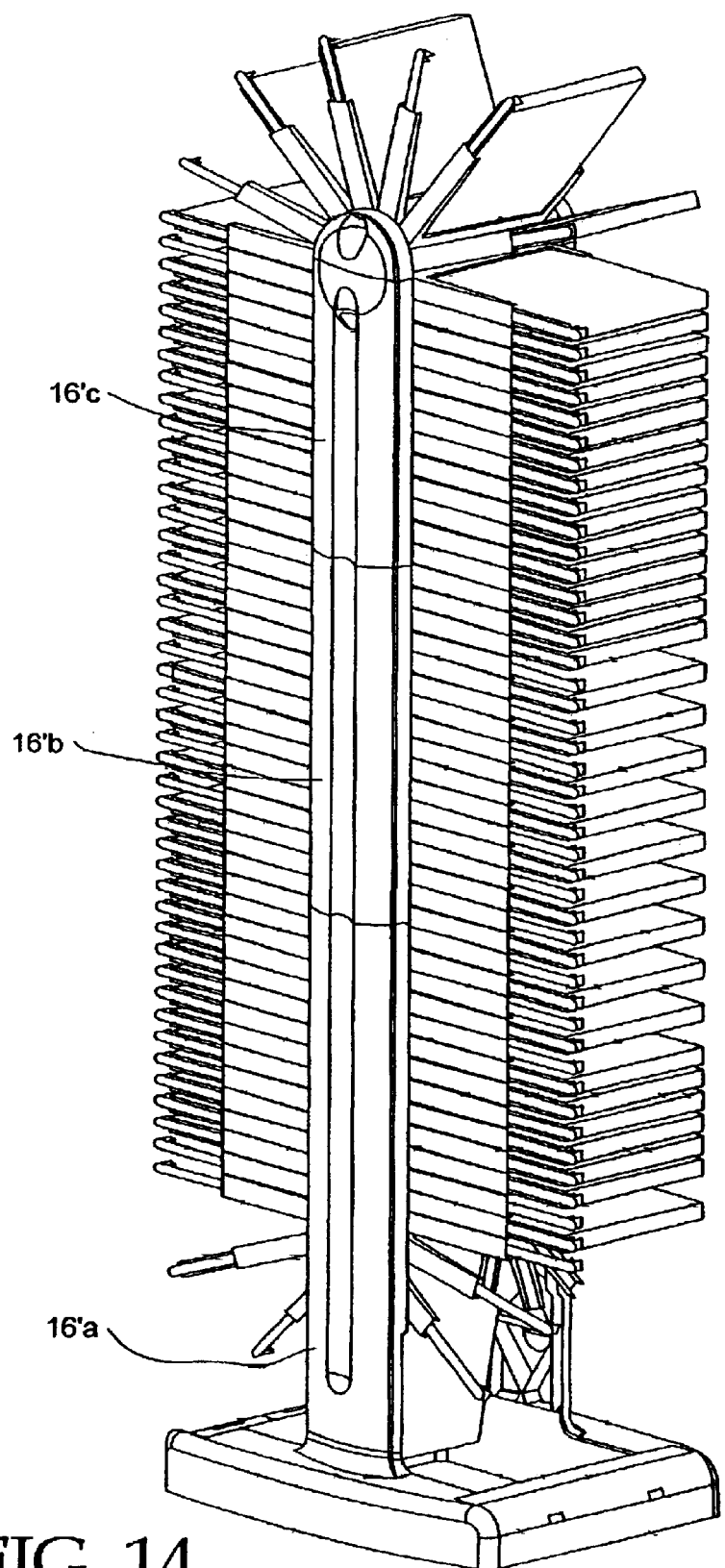
FIG. 14 is a perspective view similar to FIG. 1, illustrating an alternative embodiment of a DVD rack.

As noted earlier, belt 23 may be varied in length by adding or subtracting inter-lockable holders 32. FIG. 14 depicts a modular embodiment of rack 10, in which left and right vertical support members 14 and 16 are modular, and include for example, vertical support segments 16'a, 16'b, and 16'c. A rack 10 including a great many interlocked holders 32 can include more vertical segments 16a, 16, 16c . . . , to lengthen the rack height to accommodate the increased length of belt 23.

Finally, to further automate selection of DVDs, a bar code strip may be attached to each container 18. In one embodiment, a bar code reader 49 (FIG. 13) can be included with rack 10 such that each bar code strip is read as the cases 18 are rotated. Upon recognizing a user-desired DVD selection by its bar code, rotation of belt 23 can be halted automatically by the bar code reader, whereupon the desired DVD and its case can be removed, preferably from fan out region 11 near the top of rack 10. Supplementing the bar code reader 49, a memory unit 51 can be included to store the location of each DVD. Once the entire loop of DVDs has been scanned and the position of each DVD is stored in the memory unit 51, the location of each DVD can be efficiently located without having to scan extra DVDs to locate the desired DVD. Alternatively, multiple bar code readers can be included along the path of loop 23 to efficiently find any desired DVD. Other bar code embodiments are presented below.

Another embodiment of a holder is shown in FIGS. 10A–10F. This holder 32' shares many of the same elements as the previously mentioned holder 32, such as a female coupling 17, a male coupling 21, and a pair of fingers 34 and 35'. Instead of having a fixed length retention member 52 that extends from finger 35, the holder 32' includes an adjustable retention member 52' that slidably engages finger 35'. The adjustable retention member 52' includes a platform 54' and a pair of tabs 56 and 58 extending substantially perpendicularly therefrom. Tracks 66 are located within the finger 35' so that the adjustable member 52' can be retained by and move up and down along the tracks 66. Parallel rails extend from an inner surface of platform 54' to assist in movement of adjustable member 52' within tracks 66.

Figure 10A:
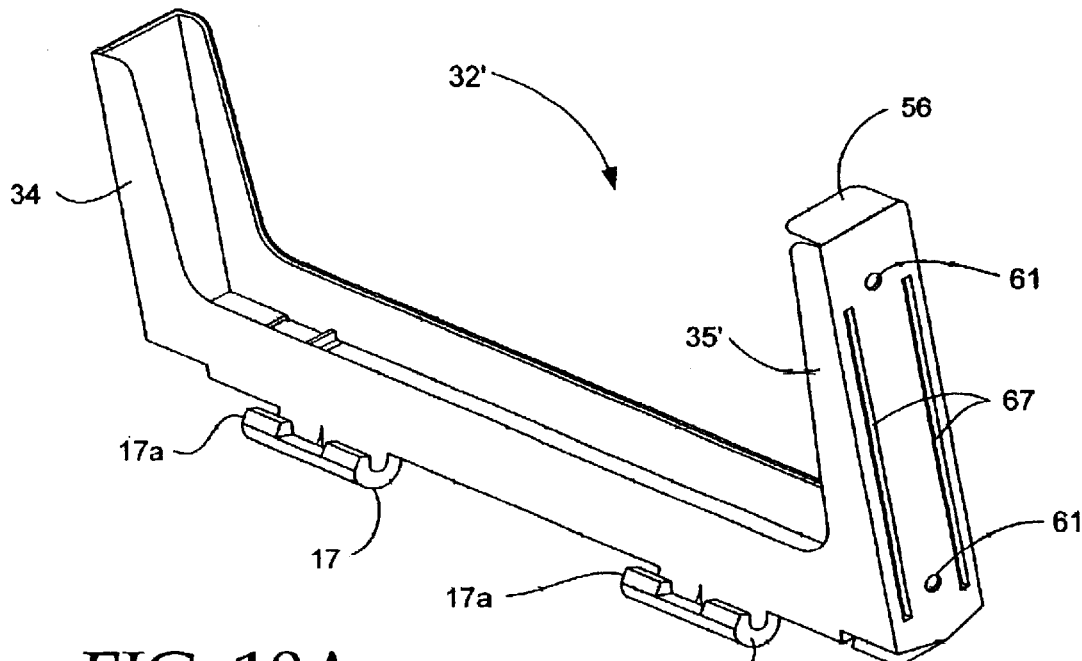
FIGS. 10A–10F.
Figure 10B:
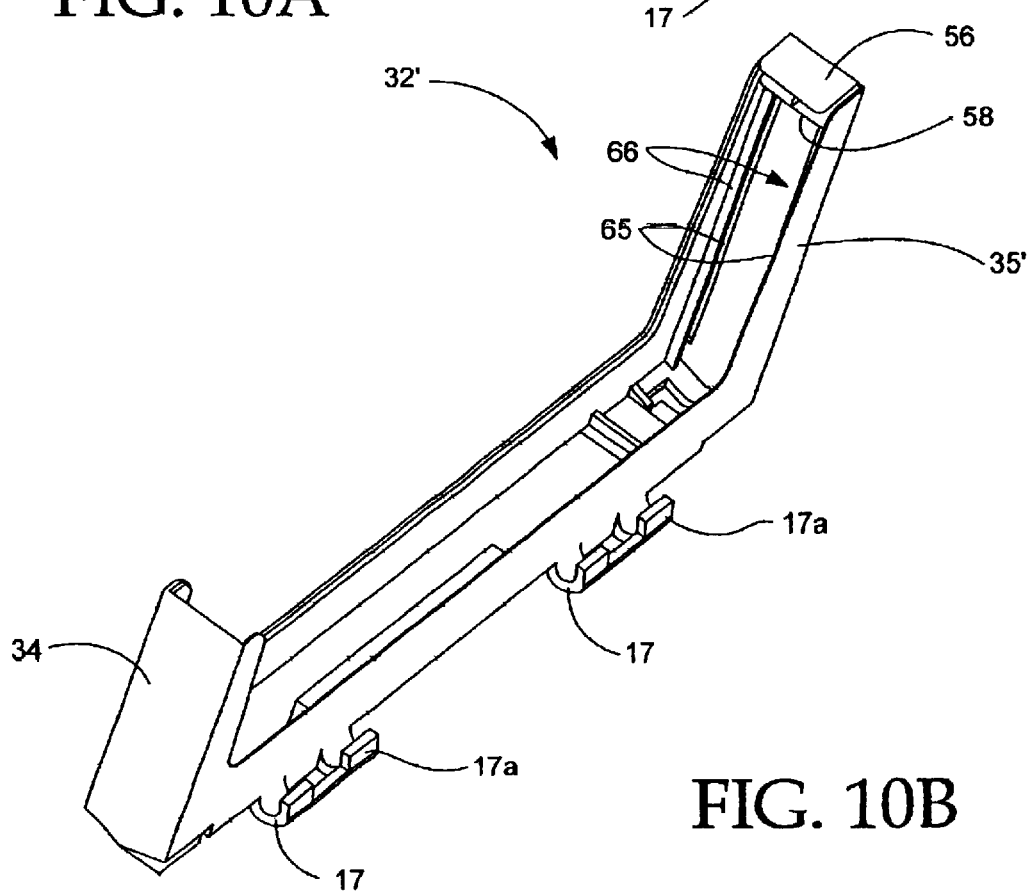
Figure 10C:
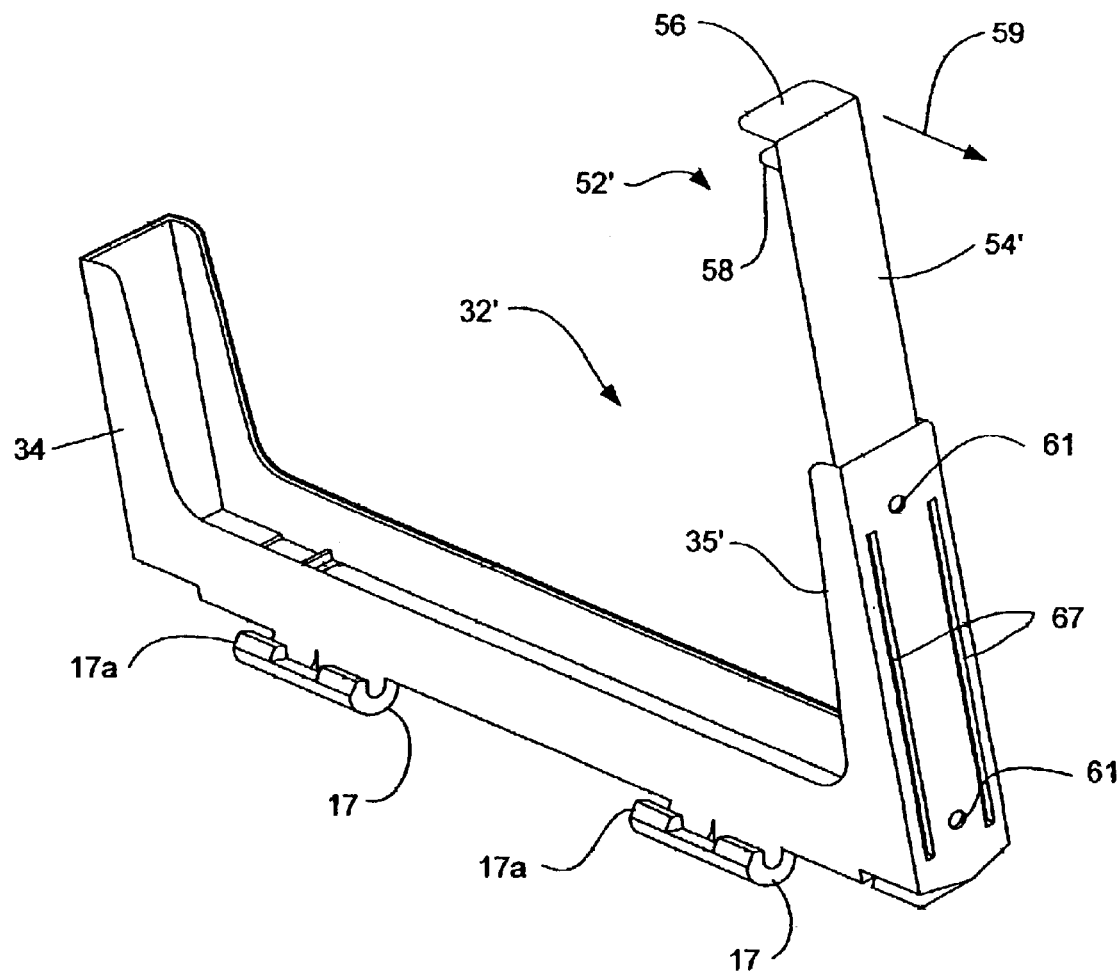
Figure 10D:
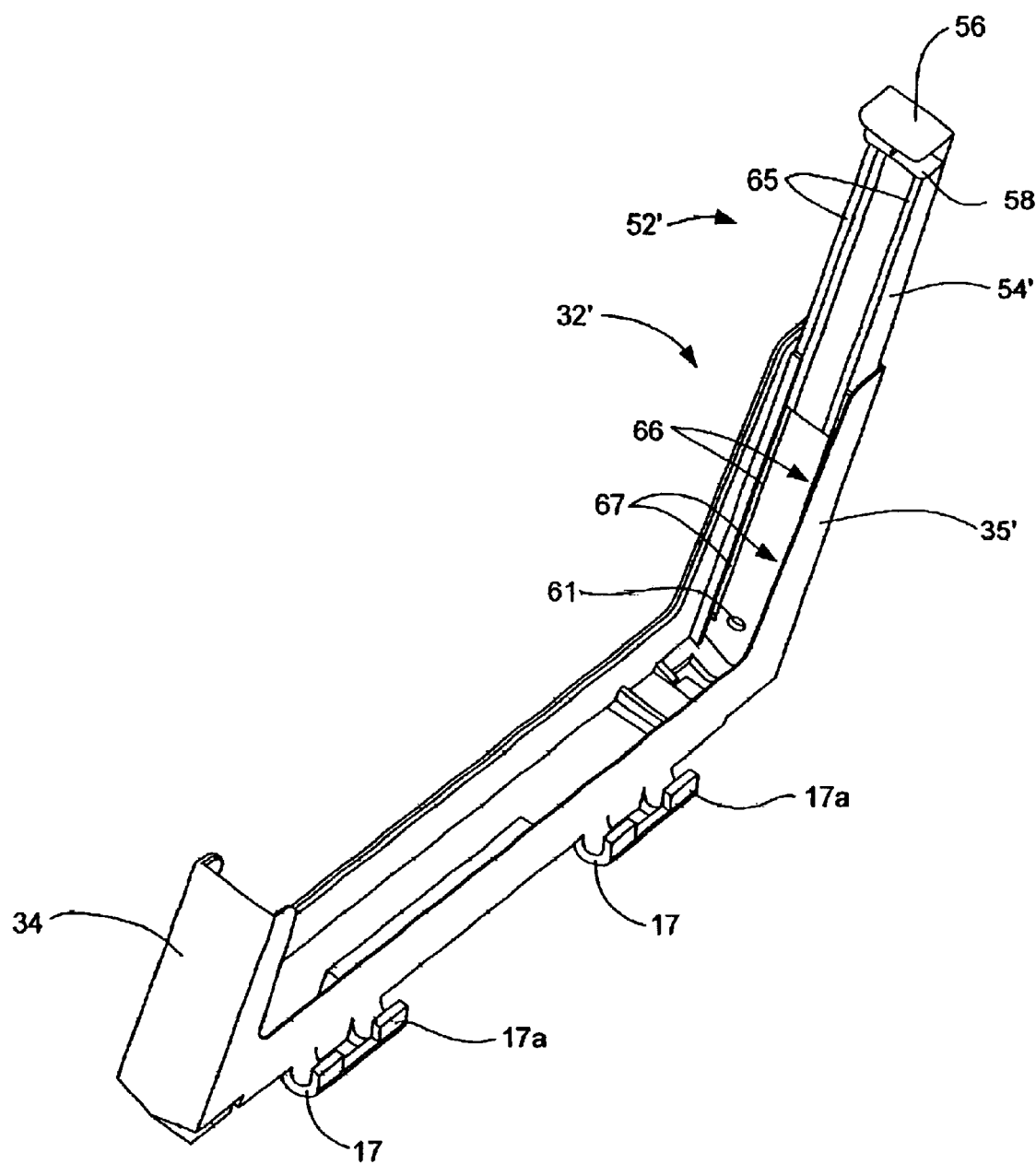
Figure 10E:
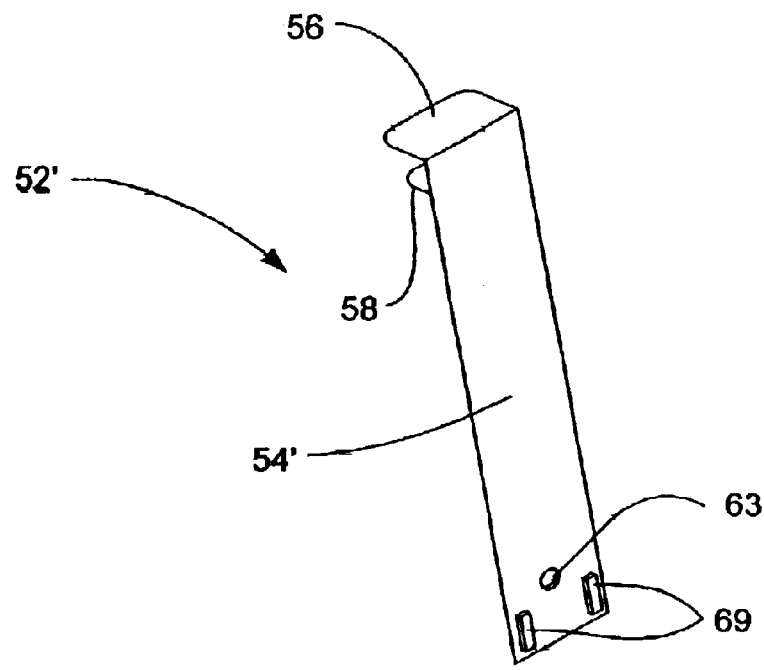
Figure 10F:
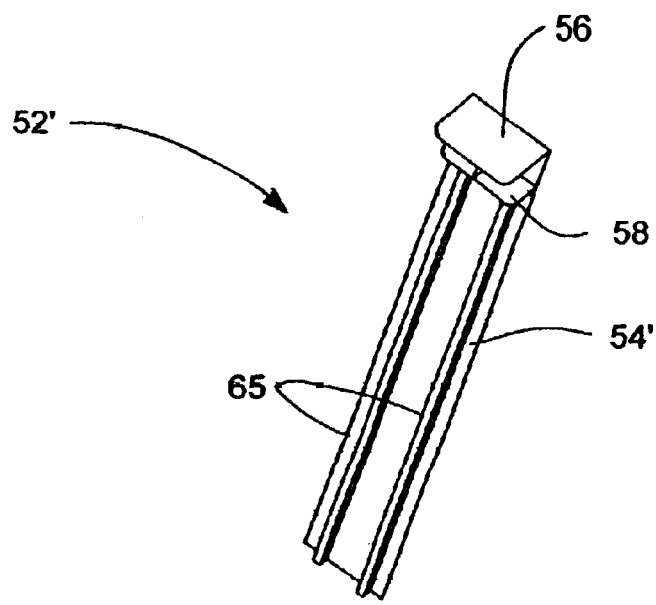

Parallel slots 67 extend into an inner surface of finger 35' and preferably through an outer surface of finger 35', as shown in FIG. 10C. A pair of holes 61 extend into an inner surface of finger 35' (one of holes 61 is shown in FIG. 10D). Each hole 61 can be an indent in the inner surface of finger 35', or preferably, can extend through an outer surface of finger 35' (as shown in FIGS. 10A and 10C). Holes 61 are shown as being round, however, they can be another shape (e.g., square). Referring to FIG. 10E, a pair of bumps or protrusions 69 are located on an outer surface of the platform 54' for engaging and traveling within slots 67 as the adjustable member 52' is moved up and down. A further bump 63 is located on the outer surface of the platform 54' for resting and locking in one of the holes 61. More specifically, when the adjustable retention member 52' is pushed all the way down, as shown in FIGS. 10A and 10B, the bump 63 rests within the lower hole 61, thereby locking the adjustable member 52' in the down position. When the adjustable member is pushed all the way up, as shown in FIGS. 10C and 10D, the bump 63 rests within the upper hole 61, thereby locking the adjustable retention member 52' in the up position. While in the up position, holder 32' can retain a first or second sized container 18. As can be seen in FIG. 10C, another hole 61' is located between the hole 61. This intermediate hole allows the member 52' to be positioned in an intermediate position to retain an object of yet another size.

When the adjustable retention member 52' is in the down position, a total length of the member 52' plus the finger 35' is substantially the same height as the finger 35' alone (i.e., the tab 56 is flush against the top of the finger 35'). Finger 35' can be made shorter to further reduce dimensions, so long as tabs 58 and 56 can achieve the proper height when adjustable retention member 52' is in the up position. In other words, finger 35' may only extend about half the length of a retained container 18, rather than about three fourths the length as discussed above. Accordingly, the dimensions of a shipping container (e.g., a corrugated box) that the DVD rack 10 with the adjustable member 52' is packaged in can be smaller and the container can require less material. This will save shipping costs and storage space. After the rack 10 is unpacked by a user and set up, the adjustable retention member 52' of each holder 32' can be pulled out until it is in the up position. Once the retention member 52' is in the up position, holder 32' operates in the same manner as holder 32. That is, holder 32' can retain either a first or second sized DVD box 18, as described above, through use of tab 58 and/or tab 56.

In another embodiment, each holder 32' can include a single tab (similar to tab 58 or 56) that extends perpendicularly from platform 54' (rather than two tabs 58 and 56). In such an embodiment, each holder 32' may be individually configured by adjusting the member 52' to the appropriate height to retain either a first or second sized DVD box 18. In such an embodiment, one or more additional bumps 61 can be located within the finger 35' so that the adjusting member 52' (including bump 63) can be locked at the appropriate height to retain either a first or second sized DVD box 18. It is also within the spirit and scope of the present invention for the member 52' to travel up and down the finger 35 by other means.

Even though many of the figures herein illustrate variations using holders 32, all variations may also incorporate the holders 32' with adjustable retention members 52'. That is, any and all of the holders that include a non-adjustable retention member 52 can be modified to include an adjustable retention member 52'.

Figure 15A:
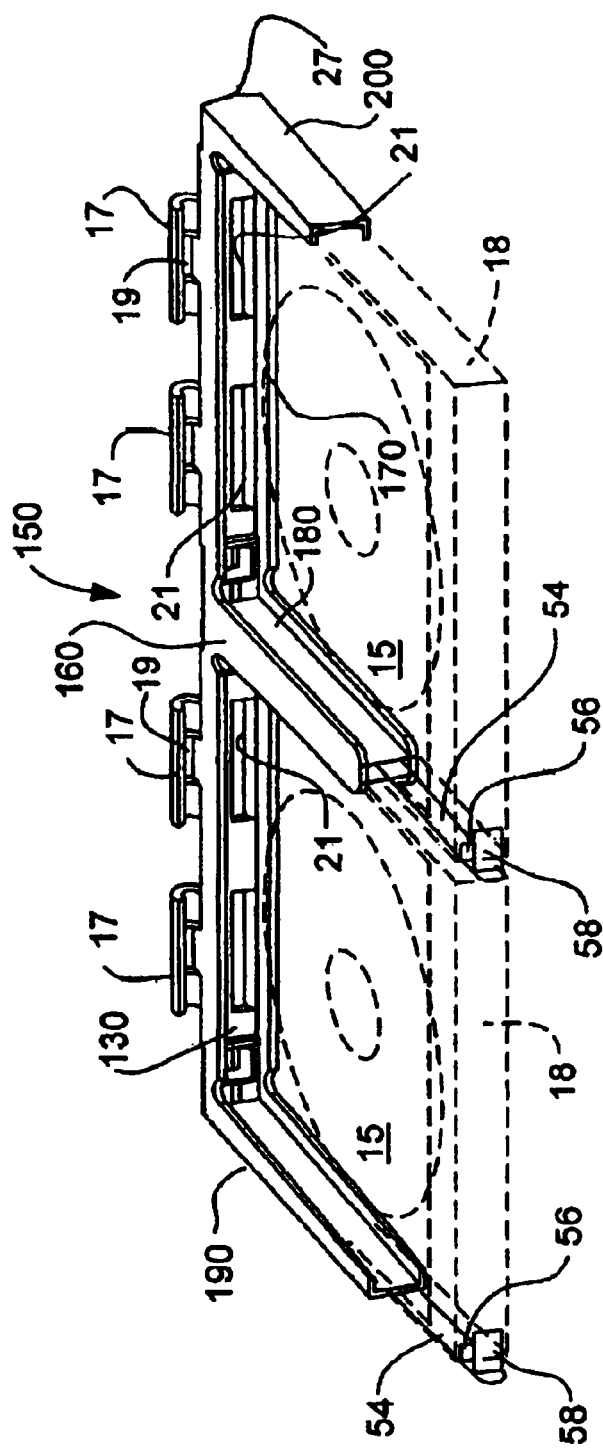
FIGS. 15A–15C.

In further embodiments of the present invention, each holder holds more than one container, for example, as shown in FIG. 15A. FIG. 15A depicts an embodiment of a holder 150 that can retain, in a side-by-side configuration, two DVD cases 18. Many aspects of holder 150 are similar to the holders 32 and 32'. The holder 150 includes upper and lower walls 160 and 170 that are joined, at least partially, to a rear wall 130. Holder 150 further includes a partition sidewall 180, that joins at least a portion of the upper and lower walls 160 and 170, and left and right outer sidewalls 190 and 200. As was the case with holder 32 as shown in FIGS. 5–9, the various sidewalls form fingers that are adapted to accept and retain containers 18.

As described herein, dual holders 150 are linked together similarly to the manner by which holders 32 (as depicted in FIGS. 11A and 11B) are linked. Thus, a preferably rear portion of holders 150 will include at least one male coupling 21 and at least one female coupling 17, which couplings 17 and 21 can be the same as those described earlier herein. By way of example, each half-section of holder 150 depicted in FIG. 15A has two female couplings 17 and two male couplings 21, although more or fewer than two couplings each can be employed. Slots 19 shown in FIG. 15A are, as before, artifacts associated with the casting of holder 150. The rear wall 130 of holder 150 includes two L-shaped slideable interlocks 47 that project from the inward facing surface 27 of wall 130 to define gaps or slots 42. As seen in FIG. 15A, holder 150 includes retention members 52 with platform 54 and tabs 56 and 58 that operate as previously described. Each holder 150 can alternatively include adjustable retention members 52', as in holder 32'.

Figure 15B:
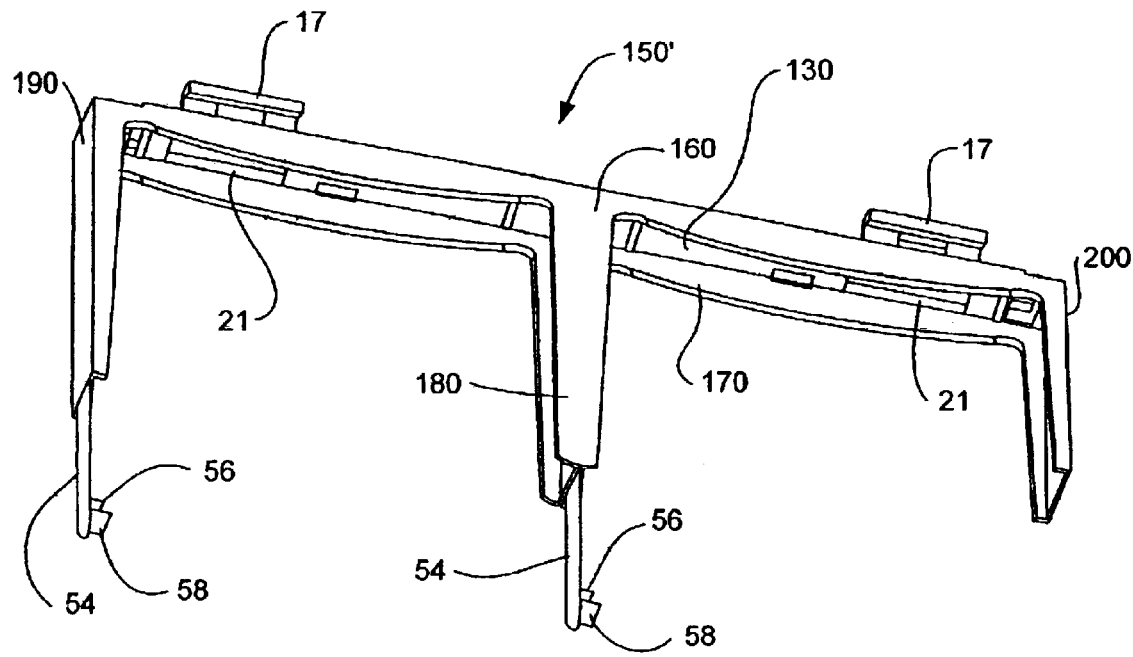

FIG. 15B depicts another embodiment of a holder 150' that can retain more than one DVD case 18 (or other object). The embodiment shown is similar to that of FIG. 15A in that two DVD cases 18 are retained in a side-by-side configuration. It is noted, however, that the configuration of FIG. 15B provides a single female coupling 17 and a single male coupling 21 for each half of the holder, as contrasted with FIG. 15A in which more than one coupling pair was disposed on each holder half.

Figure 15C:
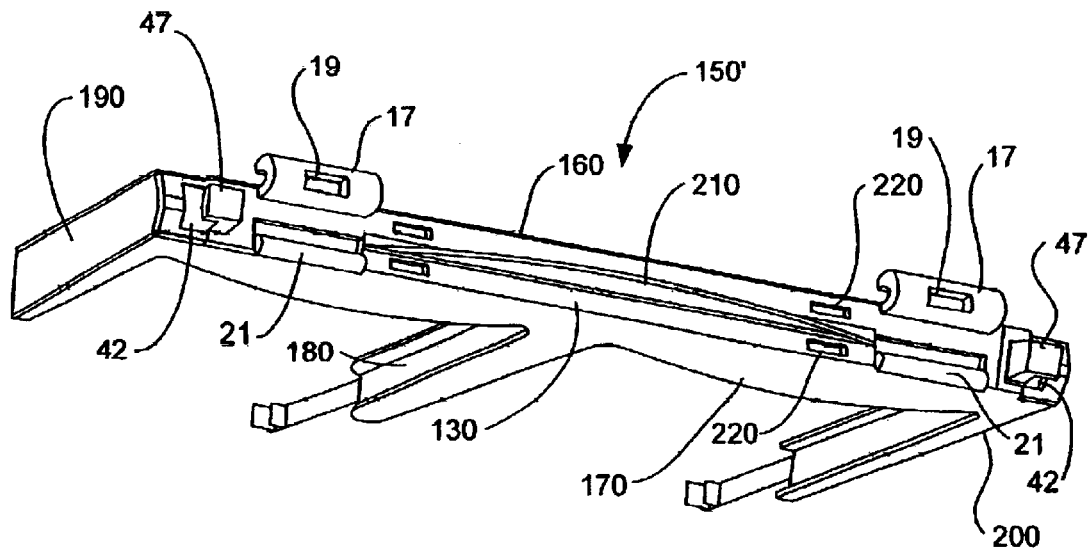

FIG. 15C is a rear perspective view of holder 150' as shown in FIG. 15B, and but for the number of female and male couplings 17 and 21 could also serve as a rear perspective view of holder 150 shown in FIG. 15A. An optional dorsal fin like member 210 maybe provided on the rear wall 130 of holder 150' or 150 to aid in retaining alignment in cooperation with the driven cogs that rotate a belt formed of holders 150' or 150, linked-together by female and male couplings 17 and 21. Slot pairs 220 show on rear surface 130 of holder 150' (or 150) are so-called core-through slots that are present to remove plastic from the region of the cast projections during manufacture of the holders.

Dual DVD case holders 150 or 150' will be approximately twice as wide as single DVD case holders 32 and 32'. As with holders 32, 32', 150, or 150', it is preferred that the holders are injection molded plastic (e.g., ABS type plastic), and that the entire holder is integrally formed as a single component, rather than as a partial component to which female and male couplings 17 and 21 may later be affixed, or to which projections 47 may later be affixed. Of course, in the embodiments including one or more adjustable members 52', each adjustable member is most likely manufactured separately from the remainder of the holder.

Further, it is noted that instead of (or in addition to) platform 54 extending from central sidewall 180, as shown in FIG. 15B, such platform can extend from sidewall 200 with the tabs 56, 58 pointing inwardly toward the retained DVD case.

The rack 10 depicted in FIG. 1 provides a single continuous belt or loop 23 of holders 32. It is within the scope of the present invention that a loop 23 can alternatively include holders 32', 150 or 150'. In other embodiments of the present invention, each rack supports multiple loops 23 (e.g., two loops) of inter-connected holders 32, 32', 150 or 150'. FIGS. 16A and 16B show a first embodiment of a dual-belt tower or rack 300 that provides two rotatable continuous loops or belts 310, 320 comprised of linked-together holders (e.g., holders 32 or 32'). In the rack configuration of FIGS. 16A, 16B, and 16C, loop rotation is about one (or two) rod shaft(s) 40 near the upper fan out region 11, and about one (or two) rod shaft(s) 26 adjacent the loop lower fan out region. Preferably shafts 40 and 26 are made of metal for reasons of strength, whereas nearly all of the remaining components of rack 300 are preferably injection molded ABS-type plastic. Alternatively, as described above, the lower shaft and associated sprockets can be eliminated and the lower portions of each loop can hang without engaging against or about a sprocket. In FIG. 16A, for ease of illustrating the drive mechanism, relatively few holders 32 and retained DVD cases 18 are shown on the loop 320. In this illustration, the loop 310 is comprised of inter-connected single DVD case retaining holders 32, and the loop 320 is also comprised of interconnected single DVD case retaining holders 32.

The rack 300 includes left and right vertical support members 330 and 340 and a central support member 350 (FIG. 16B). These three support members are attached to a base 360, for example, by joining with sections 370 that project upward from the base 360. The dual-belt tower 300 can retain approximately twice as many DVDs than the single-belt tower 10 shown in FIG. 1. Accordingly, the dual-belt tower 300 should have a larger effective base area (or "footprint") to promote stability and reduce the likelihood of the tower toppling over. For a tower height of perhaps 38", the base 360 can measure perhaps 8"×16". To provide a footprint that is larger than that of the base, outrigger-like side base projections 380 are attached to the sides of the base portion. The side base projections 380 measure perhaps 2"×12" and, for the exemplary dimensions given, can provide an effective footprint of about 12"×16" versus 8"×16" for the base 360 alone.

As best seen in FIG. 16B, the side base projections 380 preferably are removably attached to the base 360, for example by forming the side base projections with grooves that connect to projections formed in the mating portion of the base 360. Other mechanical features maybe formed in the base 360 and side support members to permit interlocking, or interlocking can be accomplished using attachment mechanisms such as screws, wing nuts, or the like.

The advantage of providing user-attachable side base projections to increase the effective footprint of the rack 300, is that with the side base projections detached, the rack 300 (and side base portions) can be shipped in a smaller carton. The base cross-sectional area of the carton is substantially reduced to where the savings in the cost of a high quality cardboard carton with indicia printed on the box sides can exceed 10%.

The base 360 preferably includes a compartment for batteries B1 that can power the motor 28, and optionally includes electronics 390 associated with an optional barcode scanning system 400 disposed in a clip-on type lamp unit 410 that includes a light source 420, for example at least one light emitting diode (LED). The lamp unit 410 attaches to a circular region at the upper portion of the vertical support member 330, which region can be similar in size to the region to which the control 37 is attached at the upper portion of the vertical support member 340. Electrical contacts 430 in the base portion of unit 410 mate with contacts 440 in the vertical support member 330. If no lamp unit is provided, the otherwise open circular region in the upper portion of member 330 can be plugged with a circular knob, similar to the control 37. Electrical wiring or traces interconnecting unit 410 to power source B1(or external power provided via input jack J1) and, if present, to circuit 390 are preferably disposed in or on the interior surface of the vertical support member 330.

In a preferred embodiment, the unit 410 includes at least a light source 420, which illuminates whenever the belts 310 and 320 are rotated, (e.g., by motor 28), and remains on for a brief time thereafter, perhaps a minute. The resultant illumination permits user selection of DVDs as they reach the fan out region 11, even if the rack 300 is used in a dark or dimly lit room.

Optionally, the DVD cases 18 may carry barcode information 450 that can identify the DVD contents. Barcode information 450 may be created by the user, or by the DVD manufacturer. A barcode scanner unit 400 preferably disposed within unit 410 can read barcodes 450 as the DVD cases are rotated into fan out region 11.

An optional handheld remote unit 460 includes a key pad 470, a power source 480 and an output transducer 490, and permits a user to cause the electronics 390 (or at least a portion of the electronics) to recognize a desired barcode 450 when scanned by the unit 410. The unit 460 can transmit desired or selected barcode information to the rack 400 using, without limitation, ultra sound, radio frequency, or infrared transmissions. An appropriate sensor 405 detects the transmitted information, which is coupled to electronics 390. A user desiring to select a certain DVD, can input on remote unit 460 the appropriate identifying information (which can be linked to, or associated with, the desired bar code either in the remote unit 460 or in the electronics of the tower 300), which is then transmitted to the sensor 405. As the two belts 310 and 320 rotate, scan codes carried by any DVD cases within scan range of the unit 410 are identified by the unit 410, and electronics 390 can cause the motor 28 to cease rotation. If desired, cessation of motor rotation can be intentionally delayed by electronics 390, to permit belt rotation to bring the desired DVD case to a more vertically upright disposition, e.g., case 18' in FIG. 16A. The remote unit 460 may be a modified or unmodified generic control such as used on TVs and VCRs, or it may be an IR or Bluetooth-compliant PDA or laptop or desktop computer. Rather than manually key in the barcode per se, preferably the remote unit 460 can transmit an abbreviated code or identification that represents the full barcode of the desired DVD that can be translated to represent the barcode identification.

Additionally or alternatively, electronics 390 can be designed to recognize certain vocal commands enunciated by a user and detected by a modified sensors 405, e.g., "stop", "go", "reverse", "faster" and "slower". In this fashion, a user who is not sufficiently close to a rack to operate the control 37, 37', or 37" (described below) but is sufficiently close to recognize when a desired object approaches the upper fan out region 11, can vocally command the rack to halt loop rotation.

Both the loops 310 and 320 (FIG. 16A) are simultaneously rotated in the rack 300 by a single motor 28 that can be identical to the motor 28 as shown in FIG. 4. The various drive sprockets and pulley assembly configurations shown in FIG. 4 are preferably also used for the dual loop configuration of FIGS. 16A and 16B. One difference is that the length of the shaft 40 is increased to drive two rather than one continuous belt of linked-together holders 32, and there can be a pair of driven sprockets 22 and 24 at the lower region of the belt 310 and 320, and there can be a pair of driven sprockets 36 and 38 at the upper fan out regions 11 for each of the belt 310 and 320. The motor 28 in rack 10 was described as being disposed in a lower portion of the rack housing. However, in rack 300, the motor 28 is shown as being disposed adjacent the upper portion of the rack housing, as shown in FIG. 16B. Mounting motor 28 in an upper portion of the rack 300 reduces sag or droop in the loops 310 and 320 that are formed by interlocking the holders 32. As a result of reduced sag, there is less likelihood that the loops 310 and 320 will disengage themselves from driven sprockets 36 and 38, for example due to the weight of the holders 32, including DVD cases 18. It is noted that the motor 28 in rack 10 (e.g., shown in FIG. 1) can also be disposed in the upper portion of the rack.

The motor 28 is, for example, about 25 mm in diameter and can be driven by 9 VDC, provided by batteries B1 disposed in the base 360, where their weight contributes to a lowered center of gravity for the overall rack. For example, six 1.5 VDC D cells can be used to power the rack 300 or an external power source can provide operating potential via an input power jack J1. In the preferred embodiment, the control 37 engages a spring loaded rotary switch S1. In a neutral (i.e., off) position, switch S1 disconnects operating power from the motor 28. When switch S1 is twisted in a clockwise direction, the loops 310 and 320 begin to rotate in a first direction, for example clockwise, and when switch S1 is twisted with control 37 further clockwise, rotation of the loops 310 and 320 slows. When the control 37 twists switch S1 in a counterclockwise direction, the loops 310 and 320 rotate in the opposite direction, for example counterclockwise, and when further twisted counterclockwise, the rotation of belts 310 and 320 slows. When the user releases control 37, switch S1 is spring-biased to the off position, and all belt rotation ceases, and if unit 410 is present, LEDs 420 will cease illumination a brief time after rotation ceases. If desired, foot-operable controls such as 37', 37" may be used in addition to or instead of control 37, to direct rotation and rotation speed of the loops 310 and 320 in the rack 300. Motor speed and direction is preferably user-controlled by controlling the polarity of the voltage from source B1 coupled to the motor, and magnitude of such voltage.

Thus, the control 37 (or foot control(s) 37', 37") governs operation of dual-loop rack 300 in a similar fashion as operation of single-loop rack 10 (as shown in FIG. 1). As a DVD box 18 containing a desired DVD 15 is moved on belt 310 or 320 to the fan out position 11 at the upper portion of rack 300, the user will halt rotation of the motor 28 to halt belt rotation. The user can then remove the desired DVD case(s) 18 from the rack 300.

It is noted that all of the features relating power supplies, motor operation, remote units, lamps, barcode readers, and the like, that have just been discussed can be included in any of the racks discussed herein.

FIG. 16B is a partial assembled view of the rack 300, showing only two of the many (e.g., perhaps two hundred) linkable holders 32 normally found on the rack 300. FIG. 16B depicts internal struts 500 that are used to secure vertical members 330, 340, and 350 to each other. As noted, during manufacture and perhaps on rare occasion thereafter it may be necessary to adjust the tension in the loops 310 and 320. Those skilled in the art will recognize that the use of shims or bearing blocks such as 510 are a convenient mechanism for accomplishing such adjustments. In the preferred embodiment, the left and right distal ends of the lengthened rotatable shaft 40 are retained in concave projecting regions 520 of left and right bearing block units 510. The concave region 510 of each bearing block unit 510 captures the distal end of the shaft 40, and can be moved vertically up or down to increase or decrease tension in the loops 310 and 320 formed by the interconnected holders 32. An outwardly facing projection 530 on each bearing block unit fits through a slot 540 formed in the vertical support member 330 and 340. Thus, vertical up or down movement of projection 530 increases or decreases belt tension. Once the desired tension is achieved, the desired vertical position of projection 530 is secured, for example by screws 550 that anchor bearing block 510 to an adjacent outer vertical support member 330 or 340. As noted, however, many other techniques are known in the art for adjusting, if needed, tension in a belt, and what is described above is exemplary.

As was described with respect to FIGS. 15A–15C, holders 150 or 150' are sized to hold at least two objects 18 in a side-by-side configuration. If desired, the width of holders 150, 150' could be increased to retain three or more objects 18 side-by side, in which case additional partition sidewalls 180 would be used. The partition sidewall preferably is joined, at least in part, to portions of the spaced-apart upper and lower walls 160 and 170 of holder 150, 150'. For example, a holder 150, 150' able to retain three DVD boxes 18, preferably would have two partition sidewalls 180 disposed to separate otherwise adjacent sides of the DVD cases. As with the various other holder embodiments described herein, such holders can be unitarily formed as a single piece of material, preferably by injection molding ABS type plastic.

Figure 16C:
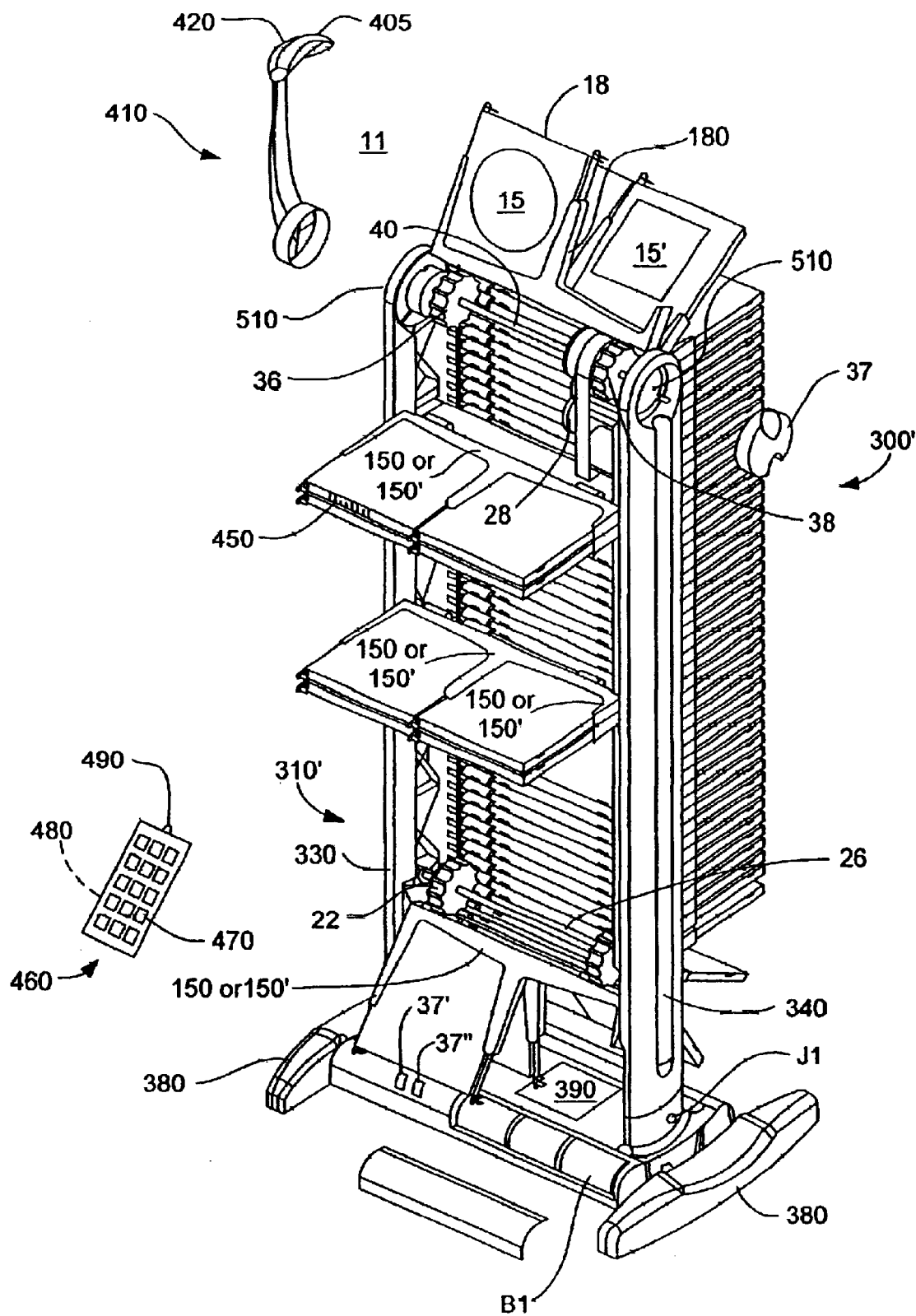

FIG. 16C depicts a rack embodiment 300' that uses a single motor 28 to rotate the loop 310' formed from a plurality of dual-object holders 150, 150', such as depicted in FIGS. 15A–15C. The various drive sprockets, gears, pulley and drive systems described with respect to FIGS. 1–2, 11A–11B, 12, 13 and 16A–16B are also applicable to rack 300'. The motor 28, which preferably is mounted in an upper region of the rack to reduce the effects of sag on the loops formed by holders 150, 150' and their contents, causes rotation of the upper shaft 40 (and/or sprockets 36, 38) in response to user operation of control 37, and/or 37', 37", or the remote unit 460. Preferably, the rack 300' can be provided with a unit 410, which can illuminate the upper fan out region 11 of the rack, and in cooperation with electronics 390 can provide scanning of barcodes 450 on objects 18 retained by the dual-object holders 150, 150'. As described earlier, electronics 390 and sensor 405 can also be used to implement voice command operation of loop movement, e.g., direction, speed, halting. The rack 300' maybe provided with detachable side base members 380 to permit shipping the rack in a smaller carton than would be possible if the actual rack base dimensions approximated the effective footprint of the rack 300'.

In FIG. 17A (and indeed in FIGS. 17B–17D), sprockets 38 and 24 (or 24') are depicted as circles for ease of illustration. In these figures, dashed line 560 denotes a simplified locus of the loop path, the loop being formed from interconnected holders such as 32 or 32' or 150 or 150'. Note that the preferably vertical spaced-apart distance between axes 40 and 26 in FIG. 17A is approximately half the length of the loop formed by the inter-connected holders. As noted elsewhere herein, the mating between male holder interconnect mechanisms 17 and female holder interconnect mechanisms 21 is sufficiently flexible to enable the resultant loop to change direction about sprockets 38 and 24 in the upper and lower fan out regions.

The configuration of FIG. 17B is similar to that of FIG. 17A except that the vertical side members 340' are broadened at the base to present a somewhat elongated triangular configuration, as contrasted with the somewhat rectangular configuration shown in FIG. 17A.

If desired, a plurality of single or multi-loop racks, according to the present invention, can be daisy-chained such that user operation of one rack can command rotation of one or more additional racks. As shown in FIGS. 17A and 17B, the communication link 570 between the racks can be a physical cable, for example connecting communication jacks J2 on each rack, or the communication link 570 can be wireless, for example Bluetooth-compatible RF, detected and signal processed by electronics 390 in each rack. In a daisy-chained environment, the user could control a master rack with control 37, 37', 37", or control remotely using device 460. Each rack preferably would include a scan unit 410 and while all racks would rotate their respective loop(s) together, as soon as a scanned object was detected by any rack, loop rotation would cease for that rack. Alternatively, as soon as a user observed a desired object approaching the upper fan out region of a rack, cessation of loop rotation for that rack could be user-commanded. If desired, daisy-chaining could be such that when one rack ceases loop rotation, all racks cease loop rotation.

Although the preferred embodiments have been described with regard to producing loop rotation by means of an electric motor, it will be appreciated that a loop formed by inter-connected single object-retaining or multiple-object retaining holders could instead be manually rotated. For example, a crankshaft-like member could be attached to upper rotation shaft 40 to directly rotate the shaft manually. Such crankshaft could project out from the left or right upper portion of a vertical support member. In another embodiment, a continuous loop formed from inter-connected holders according to the present invention might be disposed about two rotation shafts projecting out from a wall or display board. Aside from upper and lower rotation sprockets, no other structure would be required, and the user could simply manually rotate the loop. Such embodiment might be useful as part of a store display of merchandise retained by single or multi-object holders.

The foregoing description of the preferred embodiments of the present invention has been provided for the purposes of illustration and description. It is not intended to be exhaustive or to limit the invention to the precise forms disclosed. Many modifications and variations will be apparent to the practitioner skilled in the art. Embodiments were chosen and described in order to best describe the principles of the invention and its practical application, thereby enabling others skilled in the art to understand the invention, the various embodiments and with various modifications that are suited to the particular use contemplated. It is intended that the scope of the invention be defined by the following claims and their equivalents.

What is claimed is:

1. A holder adapted to hold an object that can be one of a first size and a second size, the holder comprising:

first and second fingers retained a spaced-apart distance from each other by a base to admit the object and expose at least part of the object for user selection and removal from the holder;

a retention member extending from one of said first and second fingers; and first and second tabs extending from the retention member in a direction toward the other of the first and second fingers, said first tab adapted to frictionally retain at least a portion of the object when the object is the first size, said second tab adapted to frictionally retain at least a portion of the object when the object is the second size.

2. The holder as recited in claim 1, further comprising:

a male holder-engaging mechanism extending from said base; and a female holder-engaging mechanism extending from said base;

wherein said male holder-engaging mechanism is disposed to matingly interlock with a female holder-engaging mechanism on a first adjacent holder, and said female holder-engaging mechanism is disposed to matingly interlock with a male holder-engaging mechanism on a second adjacent holder.

3. The holder as recited in claim 1, further comprising:

a male holder-engaging mechanism extending from said base with a slot extending through said base, said slot located adjacent to said male holder-engaging mechanism; and a female holder-engaging mechanism extending from said base; and wherein said male holder-engaging mechanism is disposed to matingly interlock with a female holder-engaging mechanism on a first adjacent holder, and said female holder-engaging mechanism is disposed to matingly interlock with a male holder-engaging mechanism on a second adjacent holder.

4. The holder of claim 1 wherein said holder is adapted to hold one of a DVD case of a first size and of a second size.

5. A holder adapted to hold an object that can be one of a first size and a second size, the holder comprising:

first and second fingers retained a spaced-apart distance from each other by a base to admit the object and expose at least part of the object for user selection and removal from the holder;

a retention member extending from one of said first and second fingers;

first and second tabs extending from the retention member in a direction toward the other of the first and second fingers, said first tab adapted to frictionally retain at least a portion of the object when the object is the first size, said second tab adapted to frictionally retain at least a portion of the object when the object is the second size;

a male holder-engaging mechanism extending from said base with a slot extending through said base, said slot located adjacent to said male holder-engaging mechanism; and a female holder-engaging mechanism extending from said base;

wherein said male holder-engaging mechanism is disposed to matingly interlock with a female holder-engaging mechanism on a first adjacent holder, and said female holder-engaging mechanism on a second adjacent holder; and wherein the female holder-engaging mechanism of one holder includes a distal end which is shaped to be received in the slot located adjacent the male holder-engaging mechanism of another holder.

6. A holder that can hold an object, the holder comprising:

first and second fingers retained a spaced-apart distance from each other by a base to admit the object and expose at least an end of the object, which end is located distally from said base, for user selection and removal from the holder;

a retention member extending from an end of one of said first and second fingers and said retention member located distally from said base;

a first tab extending from the retention member in a direction toward the other of the first and second fingers, said first tab adapted to frictionally retain at least an end of the object;

a male coupling mechanism extending from said base;

a female coupling mechanism extending from said base; and wherein a male coupling mechanism on a first said holder is disposed to matingly interlock with a female coupling mechanism on a second said holder, such that said female coupling mechanism of each said holder is adapted to be seated in a groove of a sprocket as each holder rotates around the sprocket.

7. A holder that can be used to form a continuous loop of matingly interlocked holders that can be rotated by a sprocket, each holder adapted to retain an object and comprising:

a first finger extending from a base, said first finger including a retention member extending therefrom, said retention member having a first tab and a second tab extend therefrom, with the second tab being further spaced from the base in order to retain a large object than can be retained by the first tab;

a male coupling mechanism extending from said base;

a female coupling mechanism extending from said base; and wherein a male coupling mechanism on a first said holder is disposed to matingly interlock with a female coupling mechanism on a second said holder, such that said female coupling mechanism of each said holder is adapted to be seated in a groove of said sprocket as each holder rotates around the sprocket.

8. The holder of claim 7, wherein said retention member is flexible.

* * * * *